United States Patent
Maeda et al.

(10) Patent No.: US 8,484,337 B2
(45) Date of Patent: Jul. 9, 2013

(54) PRESENCE COMMUNICATION SYSTEM

(75) Inventors: Jun Maeda, Kawasaki (JP); Shinya Yamamura, Fukuoka (JP); Masaaki Takase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 723 days.

(21) Appl. No.: 12/078,061

(22) Filed: Mar. 26, 2008

(65) Prior Publication Data

US 2008/0183866 A1    Jul. 31, 2008

Related U.S. Application Data

(63) Continuation of application No. PCT/JP2005/018037, filed on Sep. 29, 2005.

(51) Int. Cl.
*G06F 15/173* (2006.01)

(52) U.S. Cl.
USPC ............ 709/224; 709/205; 709/206; 709/207

(58) Field of Classification Search
USPC .................................. 709/205, 206, 207, 224
See application file for complete search history.

(56) References Cited

U.S. PATENT DOCUMENTS

| | | | | |
|---|---|---|---|---|
| 7,127,047 B2 * | 10/2006 | Wasmeier | | 379/88.25 |
| 7,219,153 B1 * | 5/2007 | Day | | 709/229 |
| 7,263,535 B2 * | 8/2007 | Malik | | 1/1 |
| 7,359,938 B1 * | 4/2008 | Davies et al. | | 709/204 |
| 7,379,732 B2 * | 5/2008 | Bells et al. | | 455/412.2 |
| 2003/0065788 A1 * | 4/2003 | Salomaki | | 709/227 |
| 2004/0135704 A1 * | 7/2004 | Fischer | | 340/994 |
| 2004/0153506 A1 * | 8/2004 | Ito et al. | | 709/204 |
| 2005/0044152 A1 * | 2/2005 | Hardy et al. | | 709/206 |
| 2005/0154698 A1 * | 7/2005 | Ikezawa et al. | | 707/1 |
| 2006/0248184 A1 * | 11/2006 | Wu et al. | | 709/224 |
| 2007/0150491 A1 * | 6/2007 | Torvinen | | 707/100 |
| 2008/0288649 A1 * | 11/2008 | Burckart et al. | | 709/230 |
| 2010/0235426 A1 * | 9/2010 | Chang | | 709/203 |

OTHER PUBLICATIONS

A. B. Roach et al., "A Session Initiation Protocol (SIP) Event Notification Extension for Resource Lists, draft-ietf-simple-event-list-07.", Network Working Group, Internet-Draft, 42 pages, Dec. 15, 2004. http://www.ieff.org/internet-drafts/draft-ietf-simple-event-list-07.txt.

Patent Abstract of Japan, Japanese Publication No. 2004-172818, Published Jun. 17, 2004.

Patent Abstract of Japan, Japanese Publication No. 2004-080619, Published Mar. 11, 2004.

Patent Abstract of Japan, Japanese Publication No. 2004-228833, Published Aug. 12, 2004.

(Continued)

*Primary Examiner* — Aaron Strange
*Assistant Examiner* — Jonathan Bui
(74) *Attorney, Agent, or Firm* — Fujitsu Patent Center

(57) ABSTRACT

A presence communication system capable of efficiently reducing the number of messages exchanged between presentities and watchers, thereby preventing lowering in communication quality. A presence server sets a group identifier as an identifier which is used to collectively look up a group of multiple pieces of presence information provided by presence information providers who have agreed to a use policy, aggregates and stores the presence information under the group identifier, and delivers the presence information requested to the group identifier. Each presentity provides the presence server with its presence information targeted to the group identifier. Each watcher requests the group identifier for the presence information provided by the presentities, and receives the presence information delivered from the presence server.

6 Claims, 37 Drawing Sheets

OTHER PUBLICATIONS

Patent Abstract of Japan, Japanese Publication No. 2004-272311, Published Sep. 30, 2004.
Patent Abstract of Japan, Japanese Publication No. 2000-201175, Published Jul. 18, 2000.
Patent Abstract of Japan, Japanese Publication No. 2003-303393, Published Oct. 24, 2003.
Patent Abstract of Japan, Japanese Publication No. 2004-302763, Published Oct. 28, 2004.
International Search Report Mailed Jan. 17, 2006 in corresponding PCT Application No. PCT/JP2005/018037.
Japanese Office Action issued on Sep. 8, 2009 in corresponding Japanese Application 2007-537514 (4 pages) (4 pages English Translation).
Patent Abstracts of Japan, Publication No. 2005-196600, Publication Date Jul. 21, 2005.
Patent Abstracts of Japan, Publication No. 2003-169358, Publication Date Jun. 13, 2003.
Partial Translation of Japanese Publication No. 2003-169358, published Jun. 13, 2003.
Patent Abstracts of Japan, Publication No. 2005-236670, Publication Date Sep. 2, 2005.
Partial Translation of Japanese Publication No. 2005-236670, published Sep. 2, 2005.
Michio Shinomura, et al. "A Proposal of Service for Communication Activation, "Presence Club"" NTT Information Sharing Platform Laboratories, NTT Corporation, Mar. 2003 (3pages).

* cited by examiner

EXAMPLE OF EVENT REGISTRATION

| | GROUP URI | START TIME | STARTING EVENT | ENDING EVENT | LOCATION |
|---|---|---|---|---|---|
| (a) | timescadule@raiway.com | AM8:00 | — | PASSING THROUGH GATE | HOME |
| (b) | timescadule@buscompay.com | — | PASSING THROUGH GATE | BOARDING BUS | — |
| (c) | timescadule@buscompay.com | PM8:00 | — | BOARDING BUS | OFFICE |
| (d) | timescadule@raiway.com | — | BOARDING BUS | PASSING THROUGH GATE | — |

FIG. 31

PRESENCE COMMUNICATION SYSTEM

This application is a continuing application, filed under 35 U.S.C. §111(a), of International Application PCT/JP2005/018037, filed Sep. 29, 2005.

BACKGROUND OF THE INVENTION

1. Field of the Invention

The present invention relates to presence communication systems, and more particularly, to a presence communication system for carrying out presence to check the status of a target of communication before the start of communication.

2. Description of the Related Art

In recent years, development of ubiquitous network has been rapidly advanced which network enables a user, wherever he/she may be, to locate a recipient with whom the user wishes to communicate, in an environment where communication is achievable, and to establish an end-to-end logical connection for initiating communication.

In ubiquitous network environments, the recipient may possibly be absent or may not have access to fulltime connection, and accordingly, allowing the user to know in advance whether the recipient is currently available or not is very effective in facilitating communication.

This function has been standardized as "presence" since it represents the presence of a recipient. With the presence function, the user is notified of the presence and status of the recipient, enabling the user to select a suitable communication means matching the status of the recipient and to initiate communication.

The presence technology enabling the user to check the status of the recipient before communication is defined in RFC (Request For Comment) 2778 of the IETF (Internet Engineering Task Force) and is currently attracting attention as a key technology in future ubiquitous networks.

FIG. 36 depicts an overview of a presence service system. The presence service system 100 is comprised mainly of a presence server 110, a presentity 120 and a watcher 130, and presence information is requested and provided via the presence server 100. The presentity 120 is an entity that presents presence information, and the watcher 130 is an entity that views the presence information (in general, the presentity is a user and the watcher is a service provider).

Basically, information flows in the manner described below. First, the watcher 130 sends a request for presence information to the presence server 110. The presence server 110 forwards the presence information request to the presentity 120, which then sends its presence information (e.g., user status indicating whether the user is currently available or not) as a reply.

The watcher 130 recognizes the status of the presentity 120 from the presence information received via the presence server 110 and, if the status permits, provides service to the presentity 120.

As conventional techniques related to presence service, a technique has been proposed wherein the presence information of a certain presentity is automatically updated using, as a trigger, change in the presence information of some other presentity (e.g., Japanese Unexamined Patent Publication No. 2004-228833 (paragraph nos. [0020] to [0046], FIG. 1)).

In the presence service according to RFC 2778, the presentity 120 provides presence information to the presence server 110 by using its own URI (Uniform Resource Identifier), and the watcher 130 specifies the URI of the presentity 120 when acquiring the presence information from the presence server 110. This enables the watcher 130 to recognize the status of the presentity 120, and the watcher 130 subsequently provides service to the presentity 120. The conventional mechanism is, however, associated with the problem that an enormous number of messages must be exchanged in a large-scale system.

FIG. 37 illustrates the problem with the conventional presence service according to RFC 2778. Let us consider a system involving 100 presentities and 100 watchers. If each of the 100 watchers 130-1 to 130-100 collects presence information from the 100 presentities 120-1 to 120-100, for example, each of the 100 presentities 120-1 to 120-100 sends presence information to the presence server 110 to be distributed to the 100 watchers 130-1 to 130-100, requiring 10,000 (=100×100) notification messages (presence information) (each presentity sends the same presence information to the 100 watchers and there are 100 presentities; therefore, 100×100).

Similarly, the presence server 110 sends the presence information to the watchers 130-1 to 130-100 by using 10,000 (=100×100) notification messages. Consequently, a total of 20,000 notification messages are required to deliver the presence information.

Thus, in the conventional presence service according to RFC 2778, the number of notification messages increases drastically with increase in the number of presentities and watchers, giving rise to a problem that the communication quality lowers.

SUMMARY OF THE INVENTION

The present invention was created in view of the above circumstances, and an object thereof is to provide a presence communication system capable of efficiently reducing the number of messages exchanged between presentities and watchers, thereby preventing lowering in communication quality.

To achieve the object, there is provided a presence communication system for executing service after presence is carried out to check status of a target of communication before initiation of communication. The presence communication system comprises a presence server having a group identifier as an identifier which is used to collectively look up a group of multiple pieces of presence information provided by multiple presence information providers who have agreed to a use policy, the presence server aggregating and storing the presence information under the group identifier and delivering the presence information requested to the group identifier, presentities as presence information-providing clients, for providing the presence server with presence information targeted to the group identifier, and watchers as presence information-requesting clients, for requesting the group identifier for the presence information provided by the presentities, and receiving the presence information delivered from the presence server, wherein the presence server sets a plurality of different group identifiers, the presentities provide the presence information to the respective different group identifiers, and the presentities each have a function of selecting one of the group identifiers and determine, with respect to the presence server, provision/non-provision or notification interval of the presence information, based on content of the presence information and a provision policy according to which the presence information is provided to the group identifiers.

The above and other objects, features and advantages of the present invention will become apparent from the following description when taken in conjunction with the accompany-

BRIEF DESCRIPTION OF THE DRAWINGS

FIG. 31 exemplifies event registration.

DESCRIPTION OF THE PREFERRED EMBODIMENTS

Figure 1:
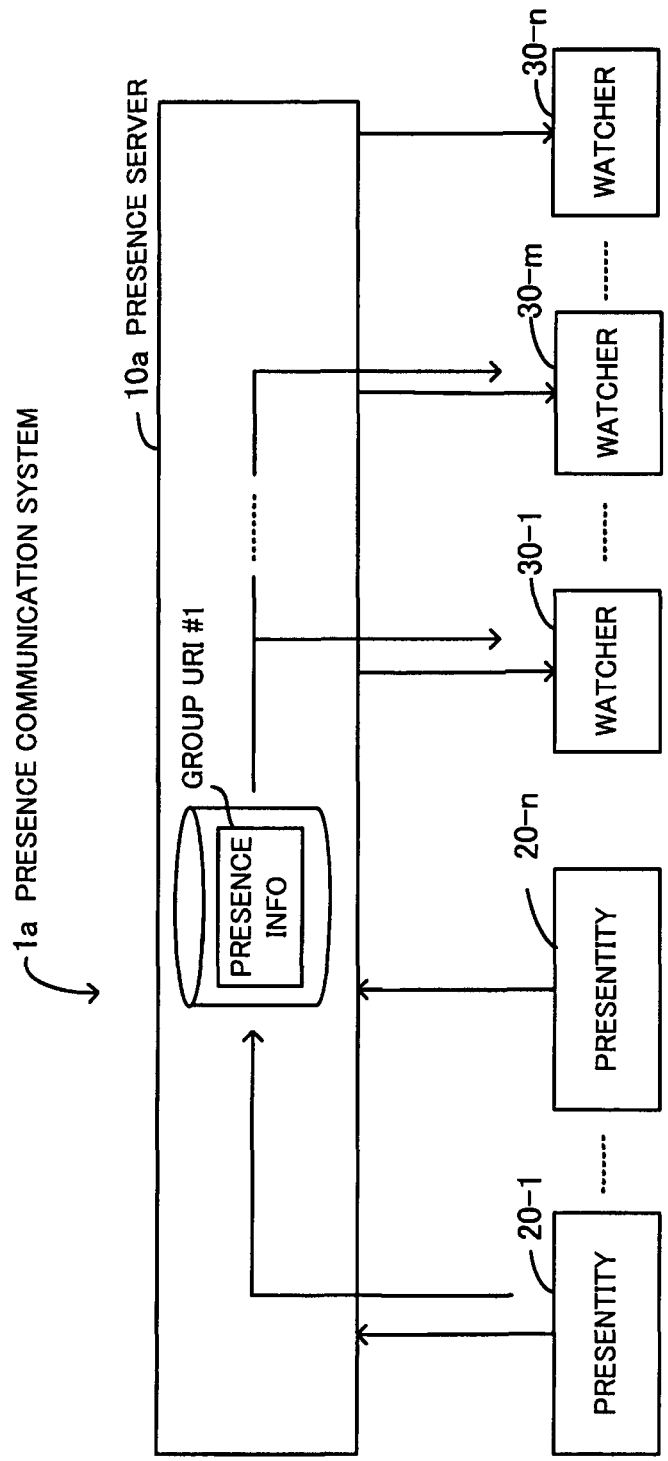
FIG. 1 illustrates the principle of a presence communication system.

Preferred embodiments of the present invention will be described below with reference to the accompanying drawings, wherein like reference numerals refer to like elements throughout. FIG. 1 illustrates the principle of a presence communication system. The presence communication system 1a comprises a presence server 10a, presentities 20-1 to 20-n and watchers 30-1 to 30-n, and is adapted to execute a service after carrying out presence to check the status of a target of communication before initiation of communication (the status of a presentity before communication).

The presence server 10a puts together multiple pieces of presence information into a group and affixes thereto a group identifier (hereinafter called group URI) identifying the group of members who have agreed to a presence information use policy. The presence server 10a aggregates and stores the presence information under the group URI and also delivers the presence information requested by means of the group URI.

The presence information is information indicating the status of a person or terminal device requesting service (e.g., information indicating whether the person is available or not or whether the terminal device is ready for communication or not).

The presentities 20-1 to 20-n, which are clients providing presence information, provide their presence information to the presence server 10a while specifying the group URI. When providing the presence information, the presentities 20-1 to 20-n select a group URI to which the presence information is to be provided, select and edit the presence information to be sent to the group URI, and send the presence information to the group URI as a destination.

The watchers 30-1 to 30-n, which are clients requesting presence information, request the group URI for the presence information provided by the presentities 20-1 to 20-n, and receive the presence information delivered from the presence server 10a.

Also, when the presence information is received, the watchers 30-1 to 30-n provide services to the presentities 20-1 to 20-n. For example, on confirming from the presence information that the presentities 20-1 to 20-n are ready for communication, the watchers deliver content to the presentities 20-1 to 20-n.

The presence communication system 1a uses, besides the identifiers of the individual presentities called URIs, group URIs for putting together multiple pieces of presence information registered by the presentities 20-1 to 20-n in accordance with common purposes, thus allowing the presentities 20-1 to 20-n to voluntarily select the group URI according to their purpose and present the presence information.

Let us consider the case where the presentity 20-1 provides presence information (e.g., information indicating whether the presentity 20-1 is available or not) and the watchers 30-1 to 30-m request the presence information.

In order for the individual watchers 30-1 to 30-m to learn the availability of the presentity 20-1 in conventional systems, the watchers 30-1 to 30-m each had to transmit a presence information request to the presentity 20-1 (m messages requesting the presence information) and the presentity 20-1 had to send the presence information to the individual watchers 30-1 to 30-*m* (m messages carrying the presence information).

By contrast, the presence communication system 1*a* of the invention controls the request and provision of presence information by means of group URIs. Let it be assumed, for example, that the presentity 20-1 and the watchers 30-1 to 30-*m* have agreed to the presence information use policy and form a single group assigned the group URI #1.

In this case, the presentity 20-1 transmits the presence information only once to the presence server 10*a* while specifying the group URI #1 as the destination, and the presence server 10*a* stores and manages the presence information under the group URI #1.

When checking the availability of the presentities 20-1 to 20-*n*, the watchers 30-1 to 30-*m* access the presence server 10*a* by using the group URI #1, whereupon the presence information, or the availability, of the presentity 20-1 is acquired.

Namely, the presentity 20-1 transmits its presence information only once while specifying the group URI #1, and when the presence information is requested from the watchers 30-1 to 30-*m*, the presence server 10*a* delivers the presence information to the individual watchers 30-1 to 30-*m*. Thus, a situation where presence information is repeatedly requested and is delivered in response to each request does not occur, unlike conventional systems, whereby the number of messages communicated can be reduced, preventing lowering in the communication quality.

Figure 37:
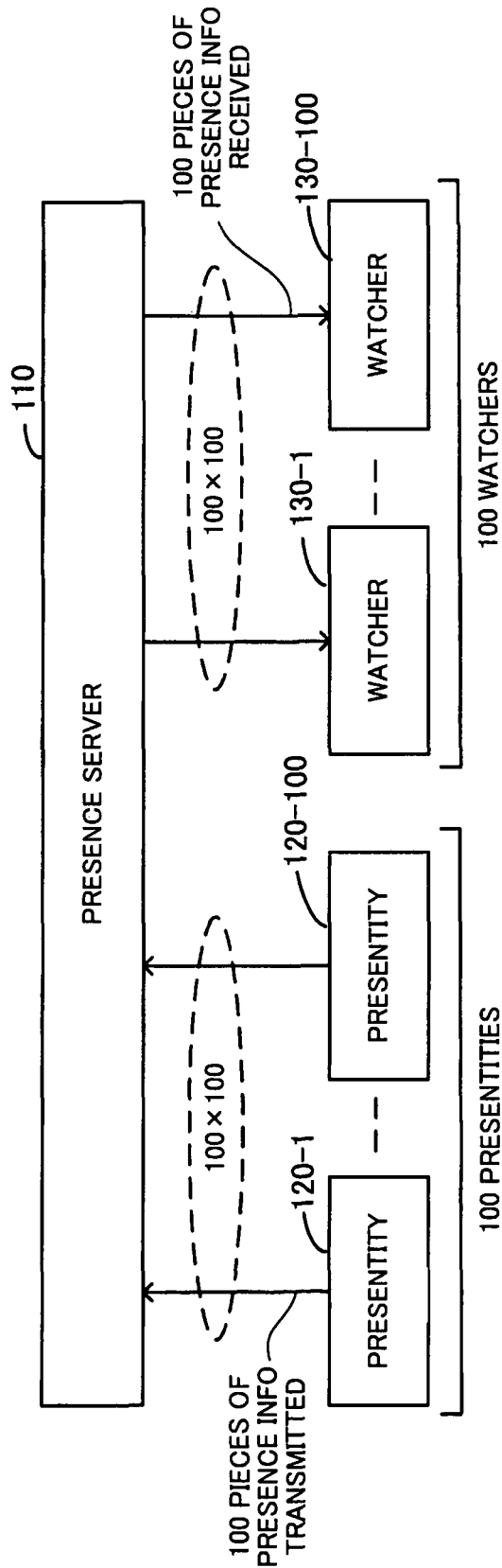
FIG. 37 illustrates a problem with a conventional presence service according to RFC 2778.

For the purpose of comparison with the conventional technique illustrated in FIG. 37, let us suppose that the presence communication system 1*a* includes 100 presentities 20-1 to 20-100 and 100 watchers 30-1 to 30-100, and that each of the 100 watchers collects presence information from each of the 100 presentities.

The presentities 20-1 to 20-100 individually provide their presence information to the presence server 10*a* while specifying the group URI with respect to which each presentity agrees to the presence information use policy that the provided information may be shared. Accordingly, each presentity has to transmit its presence information only once regardless of the number of watchers. Namely, the number of messages required in this case is 100.

The number of messages required to communicate the presence information from the presence server 10*a* to the watchers 30-1 to 30-100 is also 100, because the presence information of the multiple presentities is aggregated into a list. Consequently, a total of 200 messages suffice to communicate the presence information.

The system implemented in this manner requires a much fewer messages to collect and deliver the presence information, compared with the conventional system. The advantageous effect is even more noticeable where the number of presentities and watchers is greater.

Figure 7:
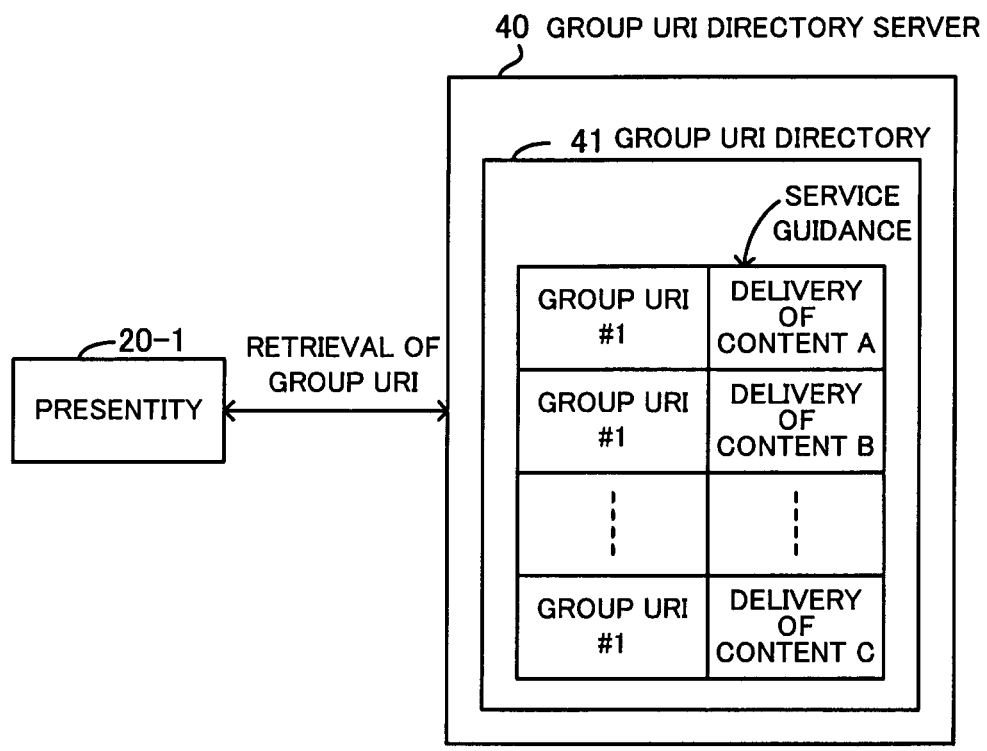
FIG. 7 shows a group URI directory server.

Also, the presentities 20-1 to 20-*n* have agreed to the use policy, disclosed in a directory, that the provided presence information may be disclosed (the group URIs are laid open by a directory server, as described later with reference to FIG. 7), and therefore, no problem arises in respect of security of the presence information (moreover, since the presentities have agreed to disclose their presence information, it is unnecessary for the presentities to make a judgment as to the propriety of watchers).

In the foregoing, the presence server 10*a* and the watchers 30-1 to 30-*n* are explained as separate functions, but the presence server 10*a* may be incorporated with the watcher function.

Figure 2:
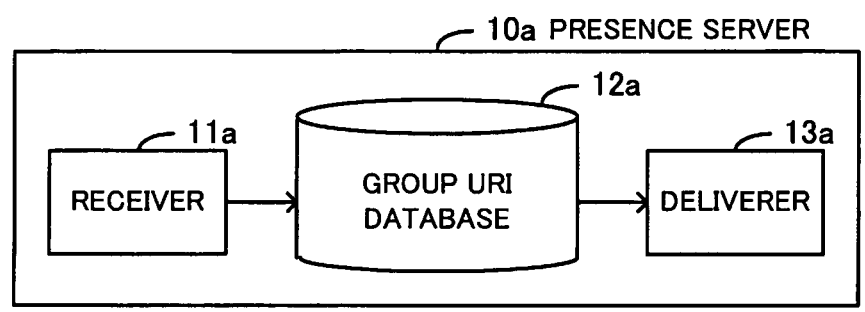
FIG. 2 shows a schematic configuration of a presence server.

FIG. 2 illustrates a schematic configuration of the presence server 10*a*. The presence server 10*a* comprises a receiver 11*a*, a group URI database 12*a*, and a deliverer 13*a*. The receiver 11*a* receives the presence information provided by the multiple presentities 20-1 to 20-*n* and targeted to the group URI.

The group URI database 12*a* stores the received presence information in the form of a list in which the presence information is associated with the identifier (URI) of the presentity (20-1 to 20-*n*). The deliverer 13*a* receives a presence information delivery request specifying the group URI from the watchers 30-1 to 30-*n*, and delivers the requested presence information, in the form of a list, to the requesting watcher.

Figure 3:
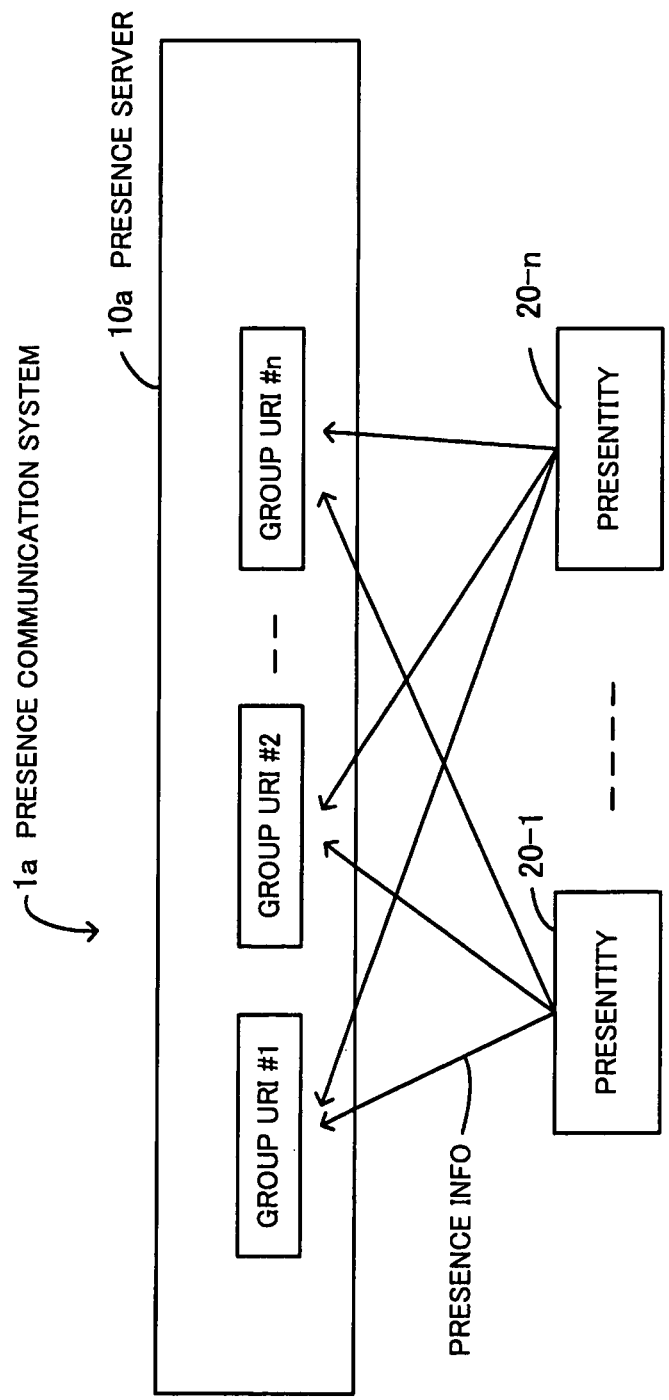
FIG. 3 illustrates the provision of presence information to multiple group URIs.

Referring now to FIGS. 3 through 8, other features of the presence communication system 1*a* will be explained. FIG. 3 illustrates the provision of presence information to multiple group URIs. The presence server 10*a* has a plurality of different group URIs #1 to #n, and the presentities 20-1 to 20-*n* provide their presence information to the individual group URIs #1 to #n.

Also, each of the presentities 20-1 to 20-*n* has a group URI selection function whereby the presentity determines, based on the content of presence information and presence information provision policy, whether to provide the presence information to the presence server 10*a* or the notification interval of presence information.

If delivery of content A is sought, for example, the presentity 20-1 provides presence information indicative of current availability to the group URI #1, and if delivery of content B is sought, the presentity provides presence information indicative of current availability to the group URI #2. The presentities 20-1 to 20-*n* themselves can determine whether to provide their presence information as well as the notification interval of presence information.

Figure 4:
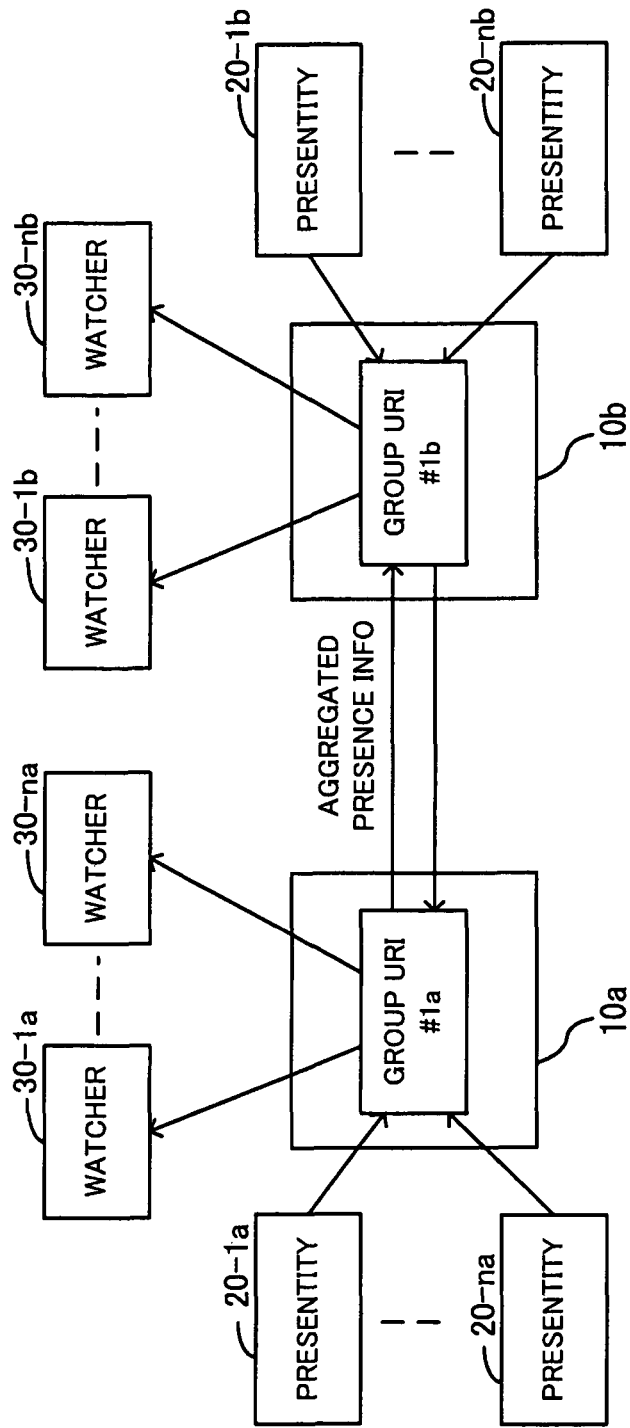
FIG. 4 illustrates the manner of how the presence information is relayed by presence servers.

The manner of how the presence information is relayed by presence servers to the multiple watchers 30-1 to 30-*n* will be now described with reference to FIG. 4.

The presence server 10*a* has a group URI #1*a*, and a presence server 10*b* has a group URI #1*b*. Suppose that the group URIs #1*a* and #1*b* are subsets of a larger group and share presence information.

Presentities 20-1*a* to 20-*na* provide their presence information to the group URI #1*a*, and the presence server 10*a* aggregates the received presence information under the group URI #1*a* and delivers the aggregated presence information to the presence server 10*b*.

Presentities 20-1*b* to 20-*nb* provide their presence information to the group URI #1*b*, and the presence server 10*b* aggregates the received presence information under the group URI #1*b* and delivers the aggregated presence information to the presence server 10*a*.

Watchers 30-1*a* to 30-*na* can receive the presence information of the presentities 20-1*a* to 20-*na* and 20-1*b* to 20-*nb* through the group URI #1*a* of the presence server 10*a*, and watchers 30-1*b* to 30-*nb* can receive the presence information of the presentities 20-1*b* to 20-*nb* and 20-1*a* to 20-*na* through the group URI #1*b* of the presence server 10*b*.

In the above example, the presence information is relayed via the group URIs #1*a* and #1*b*, but similar control may be executed such that the presence information is relayed by more than two presence servers or that the presence information is relayed via multiple group URIs within a single presence server.

Thus, multiple group URIs may be linked to collect presence information, and this makes it unnecessary for each presentity to register its presence information with respect to individual group URIs when the presentity wishes to join a plurality of similar services, whereby traffic can be reduced.

Figure 5:
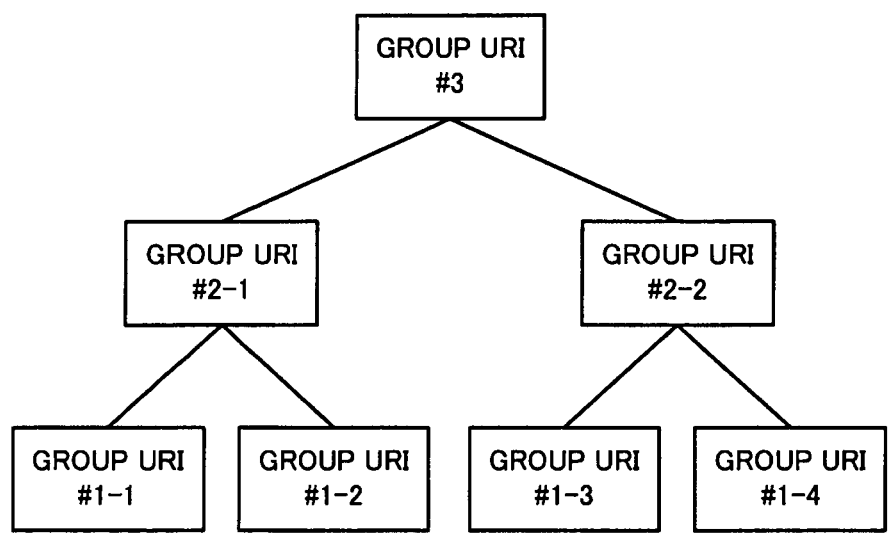
FIG. 5 shows a hierarchical structure of group URIs.

A hierarchical structure of group URIs will be now described with reference to FIG. 5. The presence server 10a has multiple group URIs organized in hierarchy and aggregates the presence information stored under the lowest-level group URIs successively from lower to higher levels such that the highest-level group URI holds the aggregation of all presence information.

In the illustrated example, group URIs #1-1 to #1-4 are at the lowest levels. Presence information stored under the group URIs #1-1 and #1-2 is aggregated and stored under a group URI #2-1, and presence information stored under the group URIs #1-3 and #1-4 is aggregated and stored under a group URI #2-2. Further, the presence information stored under the group URIs #2-1 and #2-2 is aggregated and stored under a group URI #3.

In the hierarchical structure of group URIs, the presentities provide presence information to the lowest-level group URIs #1-1 to #1-4, and the presence server 10a delivers the presence information stored under the group URI of a predetermined hierarchical level to watchers.

The hierarchical structure serves to simplify the management of numerous pieces of presence information in a large-scale system, making it possible to flexibly provide watchers with the presence information stored at suitable hierarchical levels.

As the presence information is aggregated successively from lower to higher levels of the hierarchical structure, the presence information may be gradually curtailed such that a higher hierarchical level holds a smaller amount of presence information.

Figure 6:
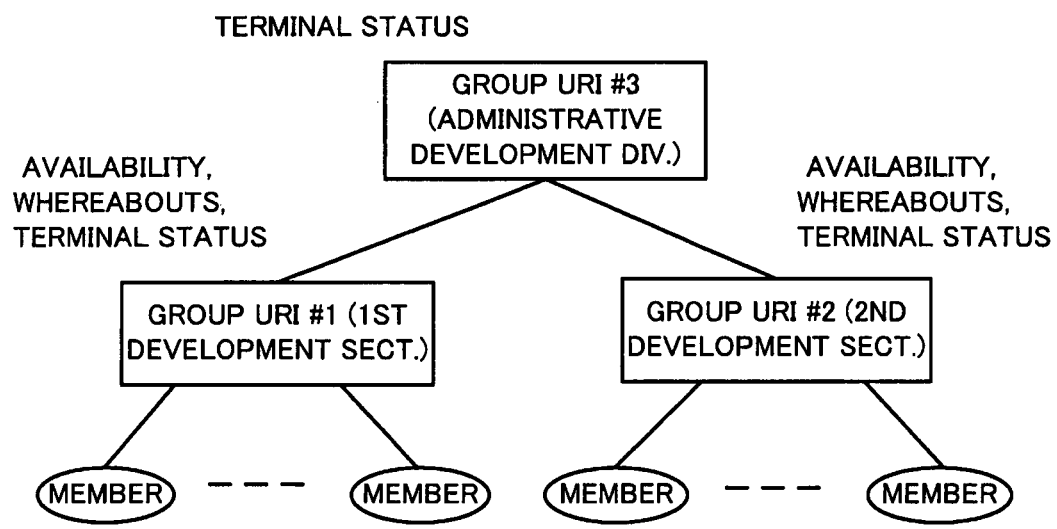
FIG. 6 illustrates a specific example of the hierarchical structure for the presence server wherein a higher hierarchical level holds a smaller amount of presence information.

FIG. 6 illustrates a specific example of the hierarchical structure for the presence server wherein a higher hierarchical level holds a smaller amount of presence information. As illustrated, the group URIs #1 and #2 are identifiers used by First and Second Development Sections, respectively, and the group URI #3 is an identifier higher in level than the group URIs #1 and #2 and used by an Administrative Development Division that supervises the First and Second Development Sections.

Each staff member belonging to the First Development Section provides presence information, such as availability, whereabouts if the member is out, and the communication status of the member's terminal, to the group URI #1. The staff of the Second Development Section provide similar presence information to the group URI #2.

The presence server 10a extracts only the necessary information from the presence information aggregated under the group URIs #1 and #2, and registers the extracted information under the group URI #3. For example, only the information about the communication status of terminals, among the presence information, is registered under the group URI #3.

A group URI directory server will be now described with reference to FIG. 7. The group URI directory server 40 holds a group URI directory 41 that allows presentities to retrieve information about group URIs, and discloses guidance on use of group URI services to the presentities 20-1 to 20-n. The presentities 20-1 to 20-n can use the group URI directory 41, just like a telephone directory, to search for a desired group URI.

Suppose that the presentity 20-1 wishes to receive a delivery service delivering content A, for example. In such cases, the group URI directory 41 may be searched, and it is found that the presentity should provide its presence information to the group URI #1 (if the presentity 20-1 provides the group URI #1 with presence information indicating that the service is acceptable, then the watcher registered under the group URI #1 delivers the content A to the presentity 20-1).

Figure 8:
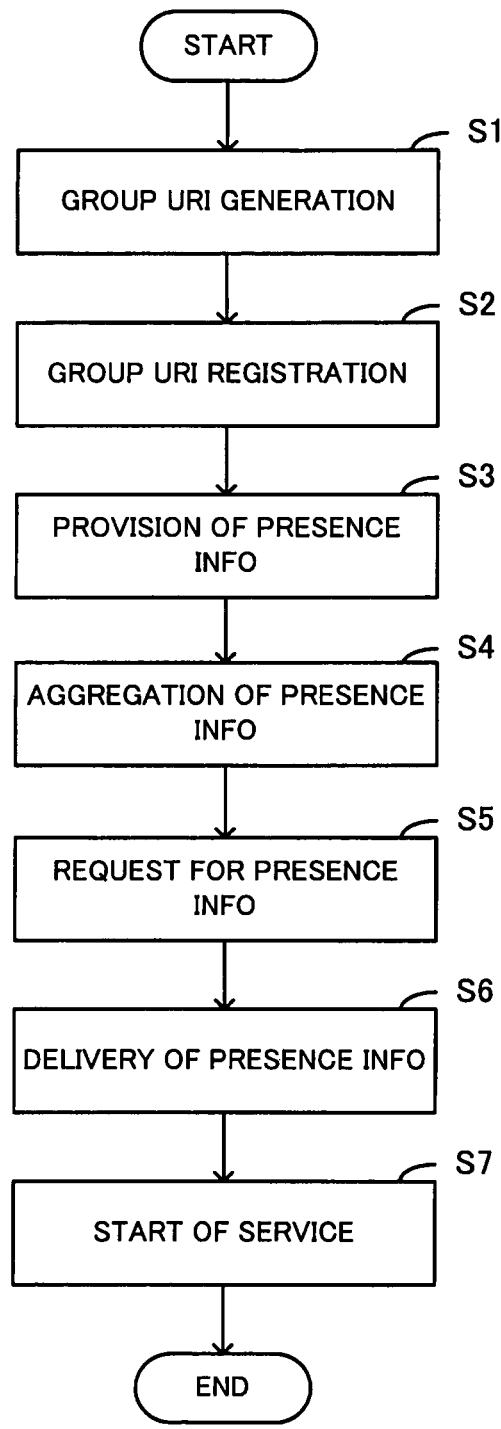
FIG. 8 is a flowchart illustrating a method of providing presence service.

A method of providing presence service will be now described with reference to the flowchart of FIG. 8.

S1: The presence server 10a generates group URIs for collecting presence information.

S2: The group URI directory server 40 registers, in the directory, the group URIs along with guidance information on the services.

S3: The presentities 20-1 to 20-n search the group URI directory server 40 for group URIs and provide their presence information to the group URIs providing desired services.

S4: The presence server 10a aggregates the presence information provided by the presentities 20-1 to 20-n and stores the aggregated information under the respective group URIs.

S5: Using the group URIs, the watchers 30-1 to 30-n request the presence information provided by the presentities 20-1 to 20-n.

S6: The presence server 10a delivers the presence information, requested by means of the group URIs, to the corresponding watchers 30-1 to 30-n.

S7: The watchers 30-1 to 30-n receive the delivered presence information, then check the status of the respective presentities 20-1 to 20-n, and provide their services to those presentities which accept the services.

Figure 9:
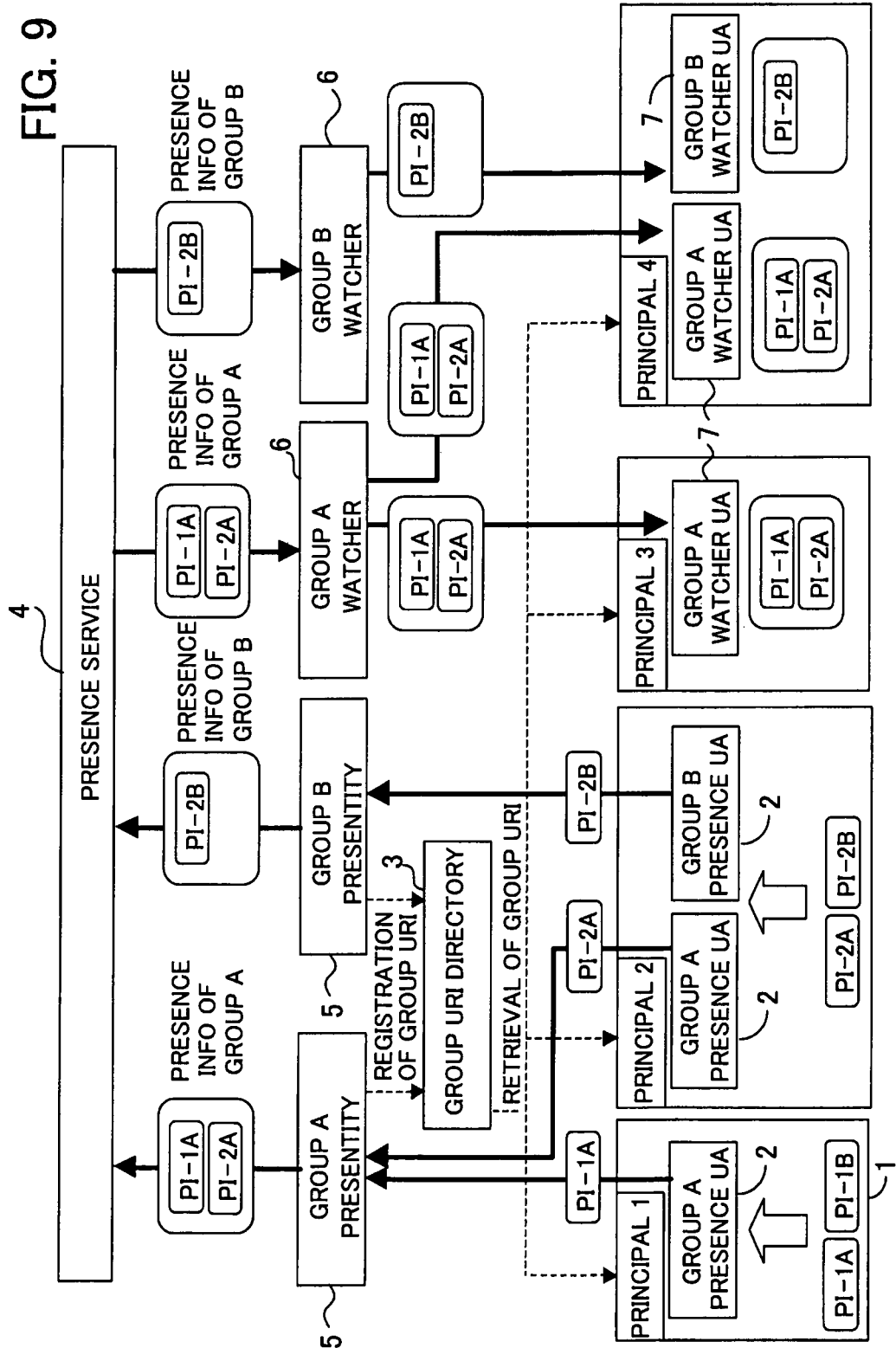
FIG. 9 illustrates a conceptual model.

The following describes in detail the configuration and operation of the presence communication system 1a. FIG. 9 shows a conceptual model of the system.

Presence Information 1

The presence information indicates the status of a principal. The principal is defined in RFC 2778 as a human or program in the real world, and the format of presence information is exemplified in RFC 2778. In FIG. 9, the presence information is shown using symbols, as PI-1A. For example, PI-1A represents presence information of type A collected by principal 1.

Group Presence User Agent: Group Presence UA 2

The group presence user agent is a means used by the principal to notify a group presentity 5 of the presence information and is dynamically generated when the principal obtains necessary information from a group URI directory 3. In the illustrated model, group A presence UA represents a presence user agent of group A, and group B presence UA represents a presence user agent of group B.

Group URI Directory 3

The group URI directory represents a directory server in which are registered the URI addresses of group URIs of group presentities 5 and group watchers 6, which the principals look up to check the recipients of the presence information and the originators of the presence information, the presence information needed by the groups, and disclosure and delivery policies of the group URIs. In the illustrated model, groups A and B denote groups collecting presence information of the types A and B, respectively, for simplicity of illustration.

Presence Service 4

Presence service 4 (corresponding to the presence server 10a shown in FIG. 1) manages the latest presence information presented by the group presentities 5 and delivers the presence information to those group watchers 6 which are registered as the recipients of the presence information of the group presentities 5.

Group Presentity 5

The group presentity 5 is an entity which combines the presence information from the group presence user agents 2 into a list and which notifies the presence service 4 of the list of presence information by using a presence protocol. When the group presentity 5 is generated, information required to notify the group presentity 5 of presence information is registered also in the group URI directory 3. In the illustrated model, group A presentity denotes the presentity of the group A, and group B presentity denotes the presentity of the group B.

Group Watcher 6

The group watcher is an entity that, using a group URI identifying a group presentity 5, requests the presence service 4 to deliver presence information. The group watcher receives a list of presence information from the presence service. As for the form of request, an idea is exemplified in draft-ietf-simple-event-list-07. In the illustrated model, group A watcher denotes the watcher of the group A, and group B watcher denotes the watcher of the group B.

Group Watcher User Agent: Group Watcher UA 7

The group watcher user agent is a means that is used by a principal to have the presence service 4 deliver the presence information of the group presentity 5. The principal searches the group URI directory 3 and negotiates with the corresponding group watcher 6, and if the negotiation meets with success, the group watcher user agent is dynamically generated. In the illustrated model, group A watcher UA indicates a watcher user agent of the group A, and group B watcher UA indicates a watcher user agent of the group B.

Process of Registering Presence Information in Presence Service 4

The principal 1 notifies the group A of its presence information, while the principal 2 notifies the groups A and B of its presence information. Suppose that both of the principals 1 and 2 have collected presence information of the types A and B. The principals 1 and 2 create respective presence user agents of the groups A and B on the basis of information obtained by searching the group URI directory 3. The group A is a group collecting presence information of the type A, and the group B is a group collecting presence information of the type B. Accordingly, the group A presence user agent of the principal 1 selects presence information PI-1A, from the two pieces of presence information PI-1A and PI-1B, and notifies the group A presentity of the selected information. The group A presence user agent of the principal 2 selects presence information PI-2A, from the two pieces of presence information PI-2A and PI-2B, and notifies the group A presentity of the selected information. The group B presence user agent of the principal 2 selects the presence information PI-2B, from the two pieces of presence information PI-2A and PI-2B, and notifies the group B presentity of the selected information.

Process of Delivering Presence Information from Presence Service 4

The principal 3 is seeking information about principals collecting presence information of the type A. The principal 3 searches the group URI directory 3 to extract the group A collecting information of the type A, then requests the group A watcher to deliver the presence information, and generates a group A watcher user agent.

The principal 4 discriminates between the types A and B of presence information and provides service to principals satisfying specified conditions. The principal 4 searches the group URI directory to extract the groups A and B collecting information of the types A and B, respectively, then requests the group A watcher and the group B watcher to deliver the presence information, and generates a group A watcher user agent and a group B watcher user agent.

The group A presentity combines the presence information PI-1A and PI-2A, received from the group A presence user agents of the principals 1 and 2, into a list and provides the presence service 4 with the list as the group A presence information.

The group B presentity renders the presence information PI-2B, received from the group B presence user agent of the principal 2, into a list and provides the presence service 4 with the list as the group B presence information.

The group A watcher is supplied with the group A presence information, which is the list of the presence information PI-1A and PI-2A, from the presence service. Then, the group A watcher distributes the group A presence information to the group A watcher user agents of the principals 3 and 4 while maintaining the format.

The group B watcher is supplied with the group B presence information, which is the list of the presence information PI-2B, from the presence service. Subsequently, the group B watcher delivers the group B presence information to the group B watcher user agent of the principal 4 while maintaining the format.

Figure 10:
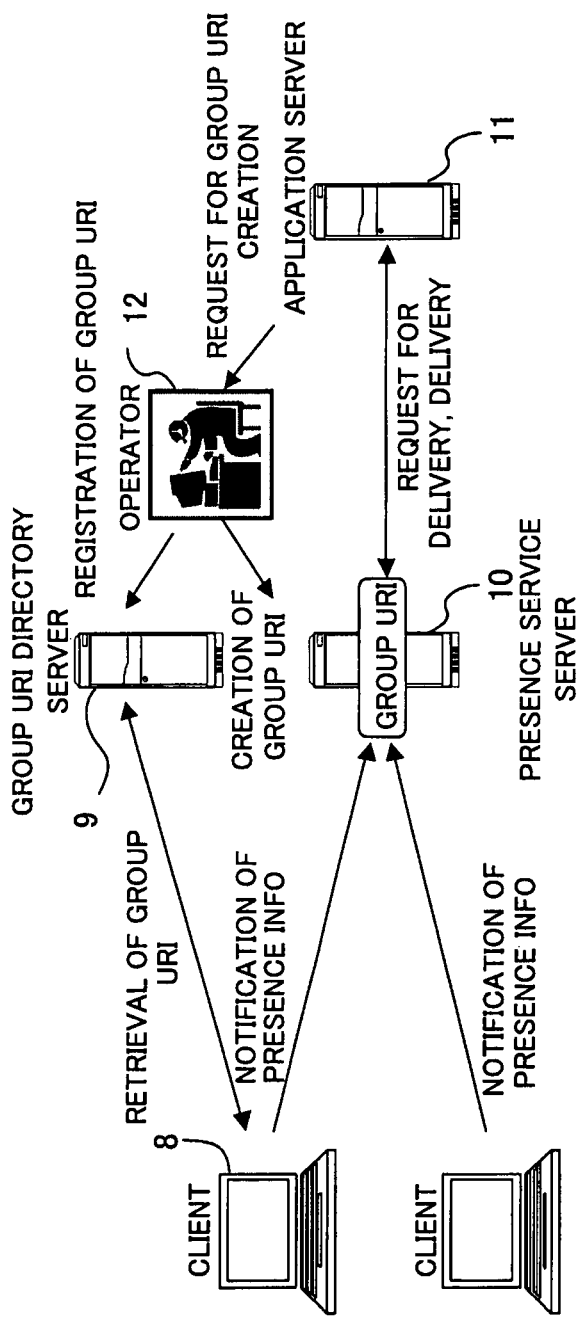
FIG. 10 shows a system configuration.

Functionality of the system will be now outlined with reference to FIG. 10 showing a system configuration.

Client 8

The client is a communication device equipped with the group presence user agent function, such as a PC, PDA, or mobile phone. In the illustrated example of implementation, the principal is defined as a user who receives service and it is also assumed that each user uses a single client terminal.

Group URI Directory Server 9

The group URI directory server is a directory server equipped with the group URI directory function.

Presence Service Server 10

The presence service server is a server that implements the presence service 4, the group presentities 5 and the group watchers 6.

Application Server 11

The application server is a server equipped with the group watcher user agent function. The application server looks up the presence information and provides service to users.

Operator 12

The operator is a group URI administrator who creates group URIs on the presence service server and registers the group URIs in the group URI directory server. The administrator may alternatively be group URI management software that works in cooperation with the application server and the clients.

Figure 11:
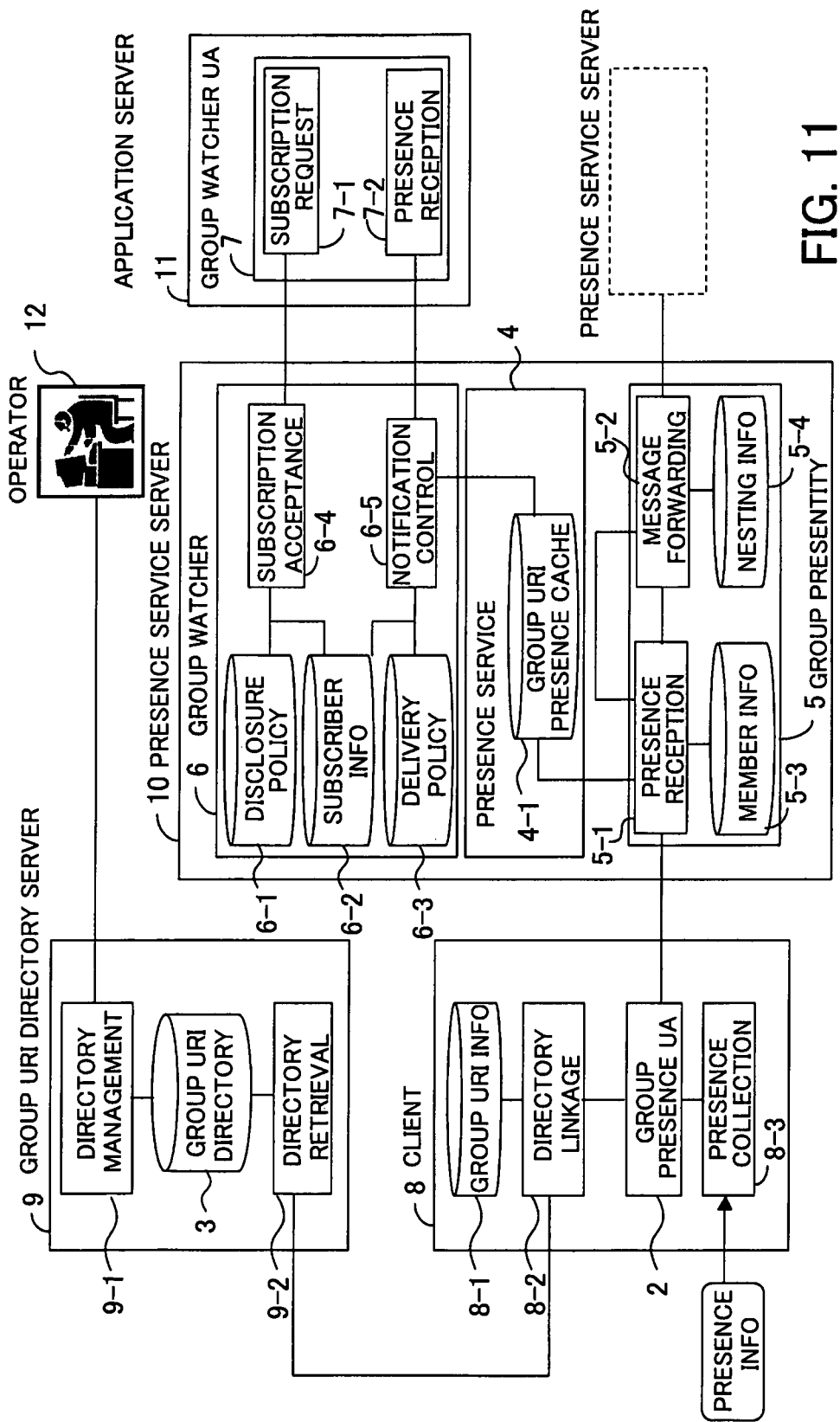
FIG. 11 shows the arrangement of databases in conjunction with functional blocks.
Figure 12:
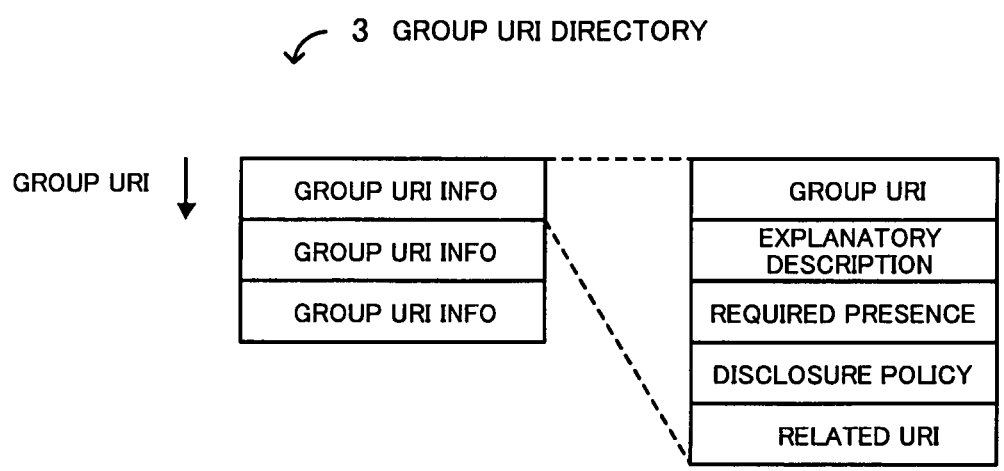
FIG. 12 shows the structure of a group URI directory.

Various types of data will be now described with reference to FIG. 11 showing the arrangement of databases in conjunction with functional blocks and FIGS. 12 through 19 showing the structures of various types of data. FIG. 12 shows the structure of the group URI directory 3. The group URI directory 3 is a database permitting users to retrieve information about group URIs, as with a telephone directory, and comprises multiple pieces of group URI information indexed by group URI. The group URI information includes group URI, which are an identifier specifying a group presentity and a group watcher, explanatory description containing information about the purpose of the group, etc. in a form understandable to humans, presence information that the group URI needs, disclosure policy by means of which the creator of the group URI specifies what policy is followed to collect information and to whom the collected information is to be disclosed, and related URI indicating a destination to which a notification message is to be forwarded upon receipt of presence information by the group presentity in cases where the group URI has a nested structure.

Figure 13:
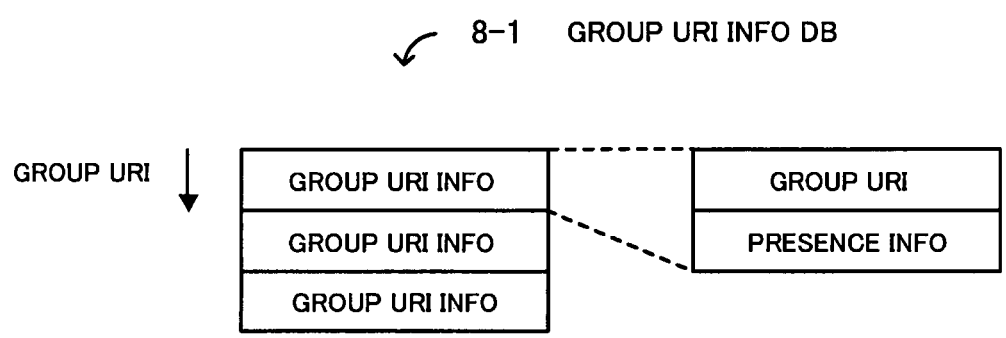
FIG. 13 shows the structure of a group URI information database.

FIG. 13 shows the structure of a group URI information database 8-1. The group URI information database 8-1 is a subset of the group URI directory and is cached index information of the group URI directory stored in a client. Each group URI information held by the database 8-1 includes group URI, which is an identifier of the destination of presence notification, and presence information that the group URI needs.

Figure 14:
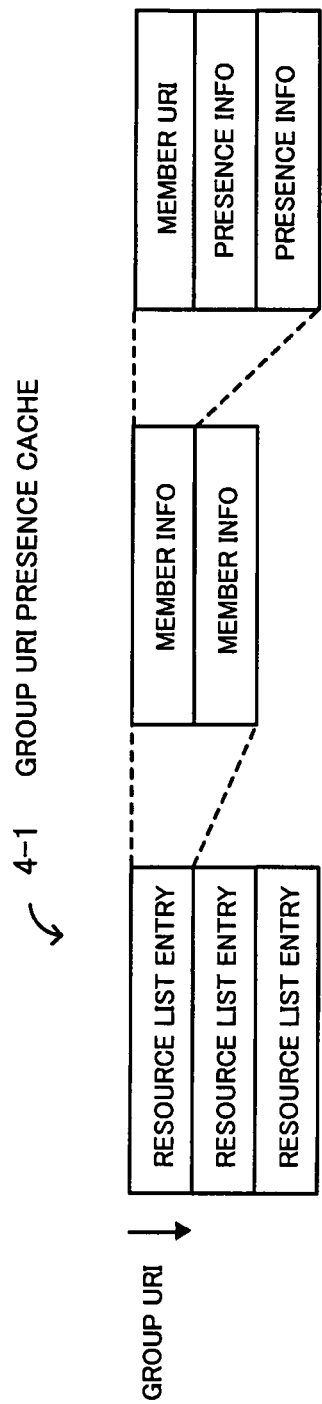
FIG. 14 shows the structure of a group URI presence cache.

FIG. 14 shows the structure of a group URI presence cache 4-1. The group URI presence cache 4-1 is a cache for storing the presence information sent from multiple clients and comprises resource list entries indexed by group URI. The resource list entry includes member information showing the current presence information of registered members forming the list. The member information includes a member URI identifying the member and the member's presence information.

Figure 15:
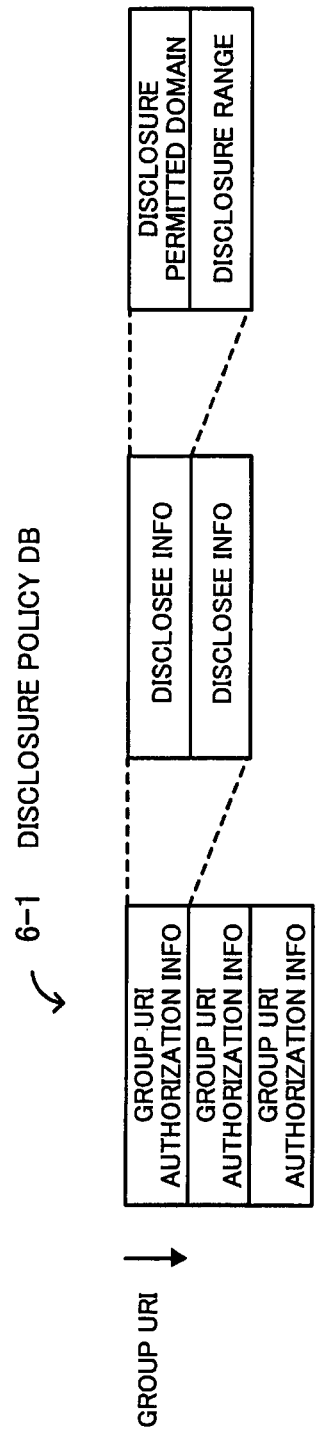
FIG. 15 shows the structure of a disclosure policy database.

FIG. 15 shows the structure of a disclosure policy database 6-1. The disclosure policy database 6-1 is a collection of information based on which whether to permit (authorize) the delivery of information or not is determined when a request for presence information is received from the application server, and comprises group URI authorization information indexed by group URI. The group URI authorization information includes disclosee information specifying each disclosee to which the information is to be disclosed. Each disclosee information includes a disclosure permitted domain indicating a target to which the disclosee information is laid open, and a disclosure range indicating the granularity of laying-open presence information and specifying whether the whole or part of the group URI registration members are to be included in the laid-open list information.

Figure 16:
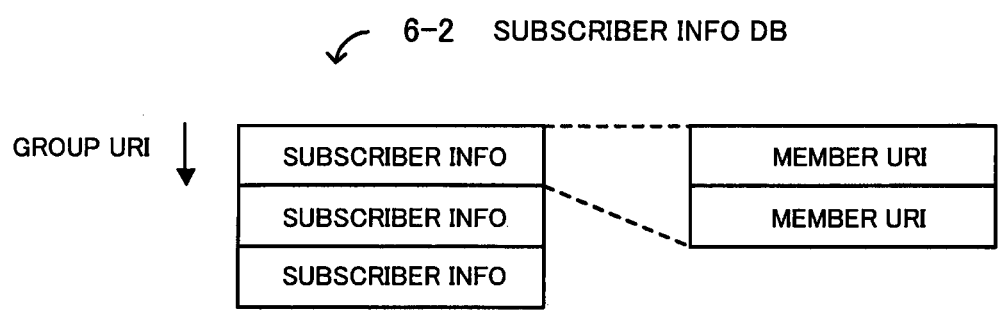
FIG. 16 shows the structure of a subscriber information database.

FIG. 16 shows the structure of a subscriber information database 6-2. The subscriber information database 6-2 is a database for managing the subscribers to the group URIs and comprises subscriber information indexed by group URI. The subscriber information includes member URIs indicating the URIs of members subscribing to the group URI.

Figure 17:
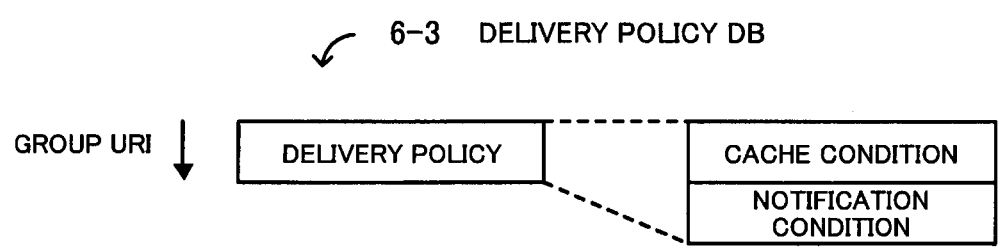
FIG. 17 shows the structure of a delivery policy database.

FIG. 17 shows the structure of a delivery policy database 6-3. The delivery policy database 6-3 specifies the timing and method for delivering update of the group URI presence cache to the application server, and comprises a delivery policy indexed by group URI. The delivery policy includes, for example, a cache condition defining the storage condition for the group URI presence cache and a notification condition specifying whether all resource or only a differential is to be delivered to the application server.

Figure 18:
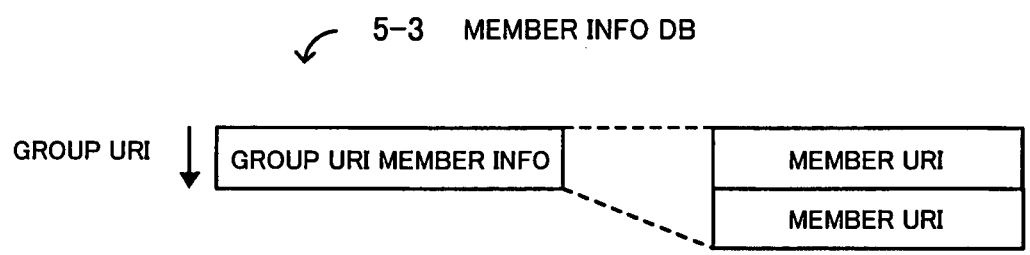
FIG. 18 shows the structure of a member information database.

FIG. 18 shows the structure of a member information database 5-3. The member information database 5-3 is a database for managing members who provide their presence information to the group URIs, and comprises group URI member information indexed by group URI. The group URI member information includes member URIs each identifying a presence registrant.

Figure 19:
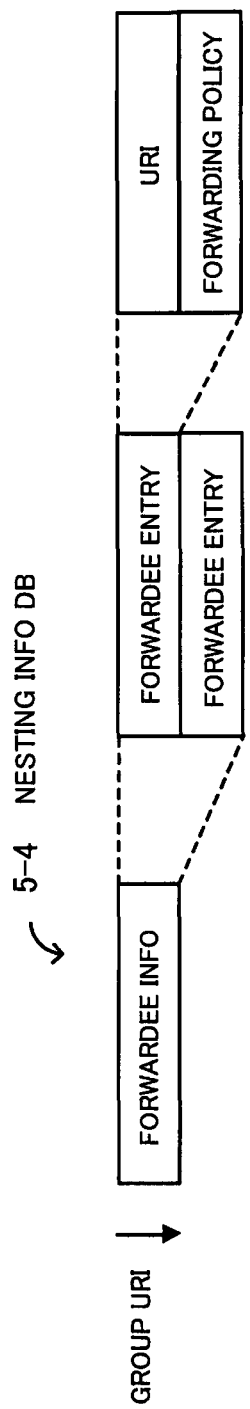
FIG. 19 shows the structure of a nesting information database.

FIG. 19 shows the structure of a nesting information database 5-4. The nesting information database 5-4 is a database showing a forwardee to which the message is to be forwarded in cases where the group URI in question is defined as a URI representative of some other URI, and comprises forwardee information indexed by group URI. The forwardee information includes multiple forwardee entries. Each forwardee entry includes a URI identifying a forwardee and a forwarding policy in accordance with which whether to forward the message or not is determined.

Referring now to FIGS. 20 to 25, the functional blocks shown in FIG. 11 will be explained in detail. The entities of the individual functional blocks are programs, which are loaded into memory (RAM etc.) and executed by the central processing unit (CPU) of a PC, server, or the like that implements the functionality of the present invention.

Client 8 (FIG. 11)

The client 8 is an entity that provides presence information to the presence server. The client sorts presence information according to group URIs and provides the presence information to the respective group URIs representing group presentities.

The client 8 comprises the group URI information database 8-1, a directory linkage function 8-2, the group presence user agent 2, and a presence collection function 8-3. The group URI information database 8-1 is already explained above.

The directory linkage function 8-2 searches the group URI directory server 9 for a required group URI to extract information necessary for the registration, such as the URI of the group URI and the required presence, from the group URI directory 3, then registers the extracted information in the group URI information database 8-1, and generates the group presence user agent 2.

When presence information is collected by the presence collection function 8-3, the group presence user agent 2 looks up the group URI information database 8-1 and creates a presence information notification message to be sent to the recorded group URI. At this time, the required items of information are selected from among multiple items of the collected presence information and are included in the message. The group presence user agent 2 may also be configured to create messages for a plurality of group URIs registered in the group URI information database so that multiple presence information notification messages may be simultaneously sent to the respective group presentities. At this time, moreover, a decision may be made as to whether or not each message should be sent to the corresponding group presentity, as the case may be.

Figure 20:
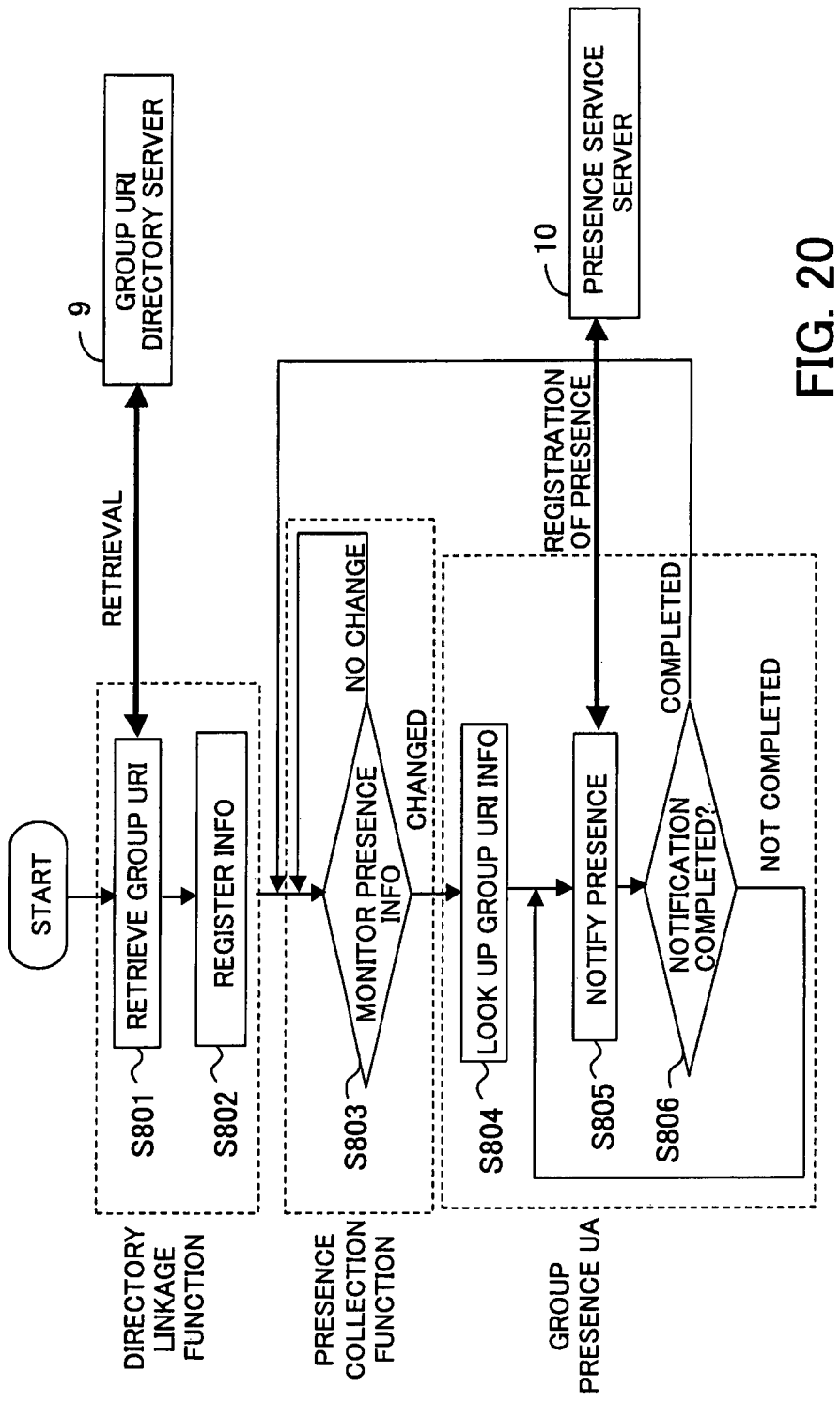
FIG. 20 is a flowchart illustrating a process executed by a client.

FIG. 20 illustrates the flow of process executed by the client.

S801: The directory linkage function accesses the group URI directory server 9 to allow the user to select a group URI corresponding to his/her desired service and downloads necessary information from the group URI directory server 9.

S802: The information required to notify the group URI of presence information is registered in the group URI information database 8-1.

S803: The presence collection function 8-3 monitors change in the presence information. The presence information may include, for example, the communication status (online, offline) of the client terminal, the user status (attending a meeting, etc.) manually input by the principal (user), and information collected by sensors (information on peripheral devices read in from RFID tags, location information obtained through the GPS, etc.). If the presence information being monitored has changed, the group presence user agent 2 is started, whereupon the process proceeds to S804. While the presence information remains unchanged, the monitoring is continued.

S804: The group presence user agent 2 looks up the group URI information database 8-1 and identifies the destination group URI and the presence information that needs to be notified.

S805: Based on the information identified in S804, the presence information notification message is edited and then sent to the presence service server 10.

S806: The group presence user agent keeps sending the presence information until the notification message is sent to all of the group URIs recorded in the group URI information database 8-1. When the presence notification process is completed, the process returns to S803 and the monitoring of the presence information is continued.

Group URI Directory Server 9 (FIG. 11)

The group URI directory server 9 is a server aimed to disclose the information on group URIs to clients. The group URI directory server 9 comprises a directory management function 9-1, the group URI directory 3, and a directory retrieval function 9-2.

The directory management function 9-1 offers a GUI that enables the operator to generate and register group URIs, and registers the input information in the group URI directory 3. The group URI directory 3 is already explained above.

The directory retrieval function 9-2 provides the client 8 with an API for retrieving group URIs. Following a search instruction from the client 8, the directory retrieval function searches the group URI directory 3 and sends the client 8 the information on the group URI specified by the client 8.

Figure 21:
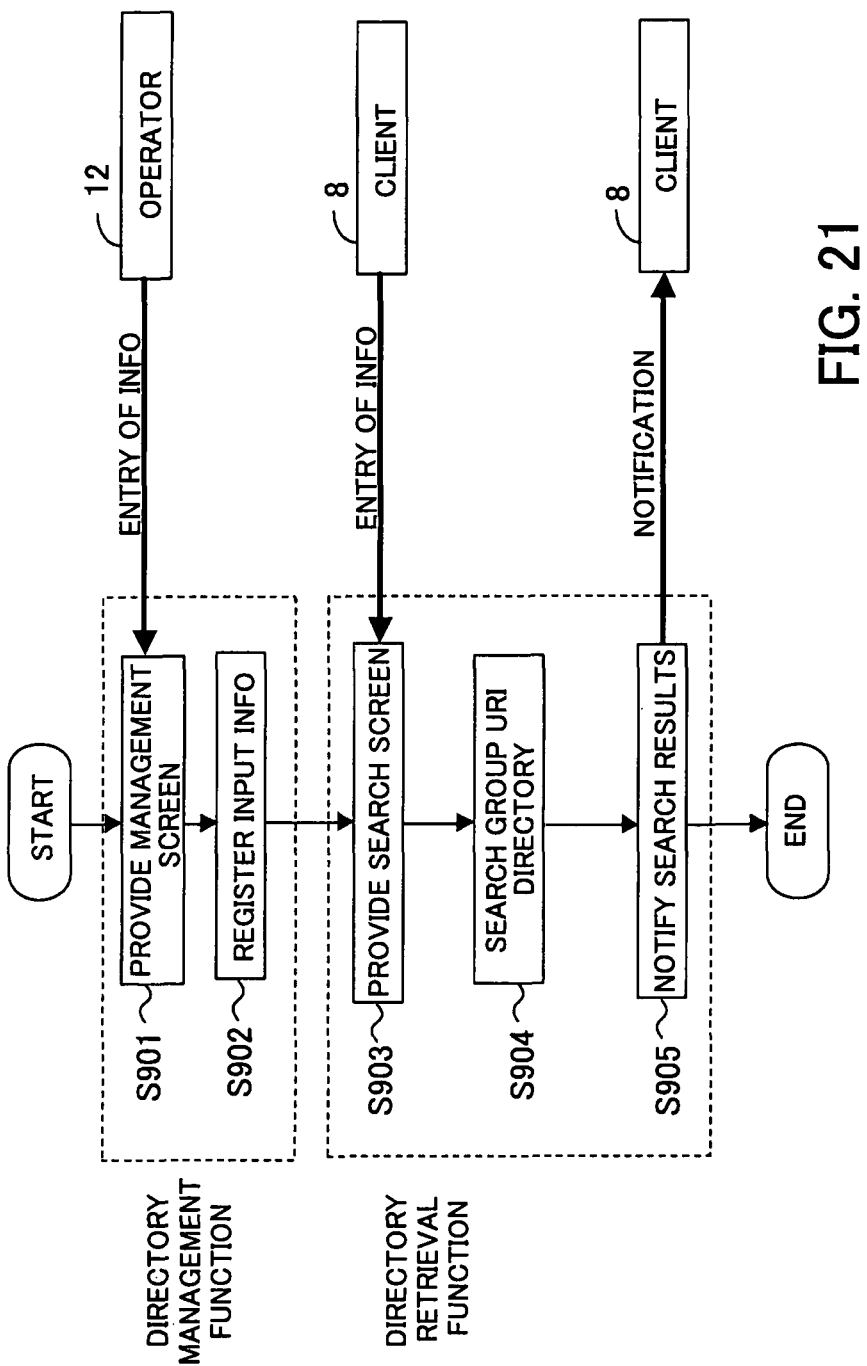
FIG. 21 is a flowchart illustrating a process executed by the group URI directory server.

FIG. 21 illustrates the flow of process executed by the group URI directory server.

S901: On the management screen of the group URI directory server 9, the operator creates a group URI and enters necessary information.

S902: The input information is registered in the group URI directory 3.

S903: On the group URI search screen, the client 8 enters information necessary to search for a desired group URI.

S904: The group URI directory is searched in accordance with the input information.

S905: Information about the identified group URI is sent to the client 8.

Presence Service Server 10 (FIG. 11)

The presence service server 10 has the function of accepting presence information notification messages sent from multiple clients 8 and targeted to the respective group URIs and registering the messages, as list information, in the group URI presence cache 4-1. Also, the presence service server has the function of delivering a list of presence information, in which multiple pieces of presence information from multiple clients 8 are aggregated, to the application server 11 which is requesting the group URI for delivery of presence information.

The presence service server 10 comprises the group presentity 5, the presence service 4, and the group watcher 6.

The group watcher 6 is an entity that accepts a request to a group URI for delivery of presence information and manages the delivery of presence information to the application server. The group watcher comprises: the disclosure policy database 6-1 which is looked up when authenticating a presence information delivery request; the subscriber information database 6-2 for managing the list of requesters who request the group URIs for delivery of presence information; the delivery policy database 6-3 defining methods of delivering the presence information; a subscription acceptance function 6-4 for accepting messages requesting subscription to the group URIs; and a notification control function 6-5 for delivering the presence information to the application server 11 when the group URI presence cache 4-1 has been updated. The group URI presence cache 4-1 is already explained above.

The group presentity 5 is an entity that accepts presence information notification messages sent from clients and targeted to respective group URIs. The group presentity comprises: a presence reception function 5-1 for accepting the presence information notification messages, aggregating the multiple pieces of presence information sent from multiple clients and targeted to respective group URIs, and registering the aggregated presence information in the group URI presence cache 4-1 and the member information database 5-3; a message forwarding function 5-2 for forwarding a presence information notification message to another presence service server in cases where the group URI is related with some other URI; and the nesting information database 5-4 recording the relationship of the group URIs with other URIs.

Figure 22:
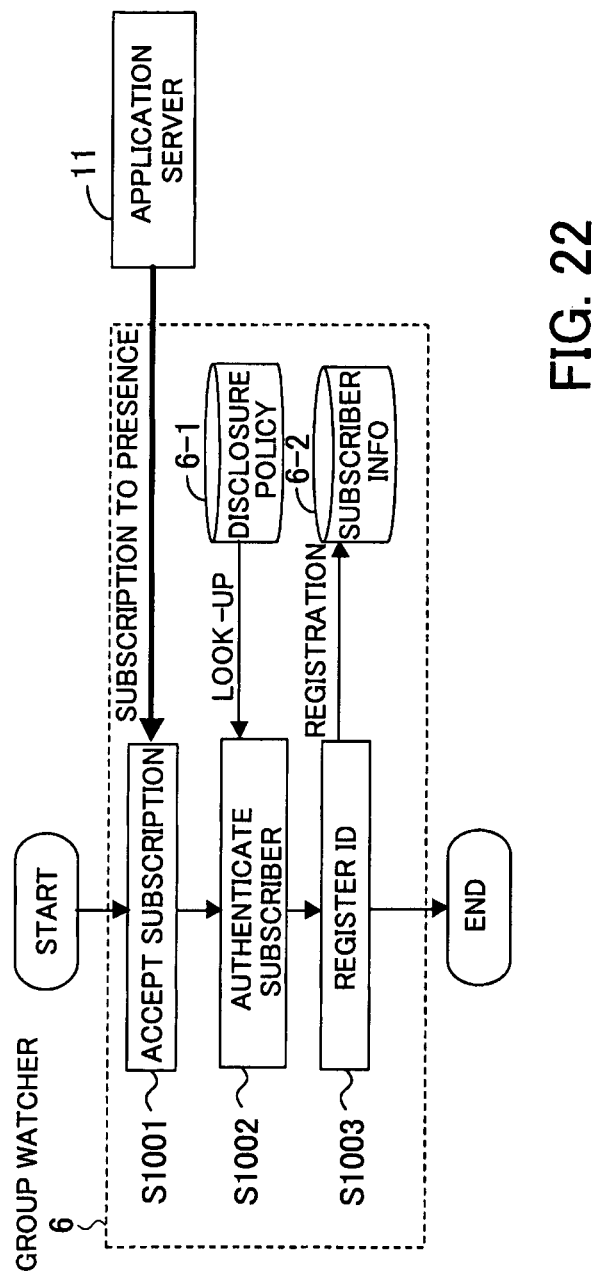
FIG. 22 is a flowchart illustrating a group URI subscription process.
Figure 23:
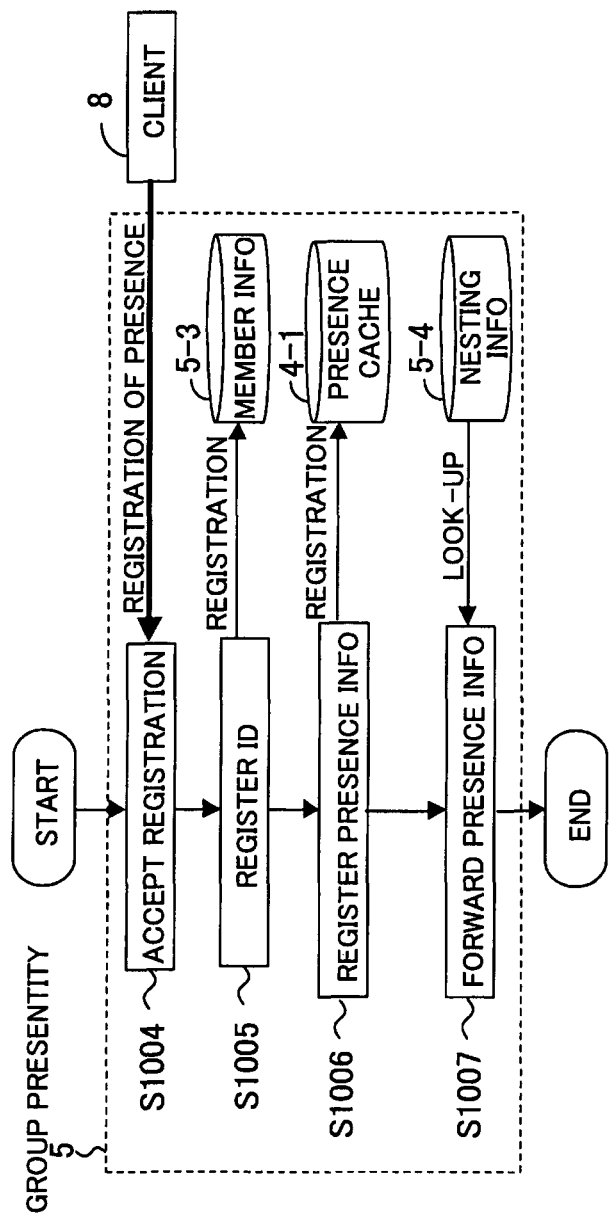
FIG. 23 is a flowchart illustrating a process of registering presence information with respect to a group URI.
Figure 24:
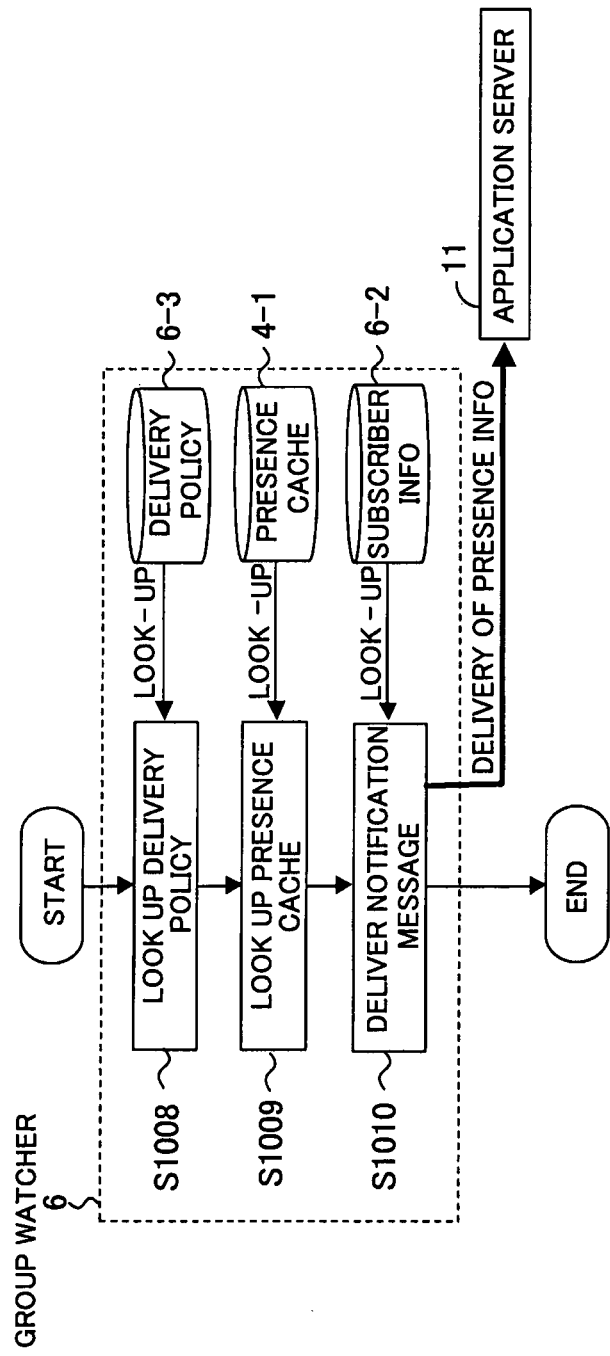
FIG. 24 is a flowchart illustrating a presence information delivery process.

FIGS. 22 to 24 individually show the flow of process executed by the presence service server. FIG. 22 illustrates the flow of a group URI subscription process.

S1001: The application server 11 sends a presence information delivery request message to a group URI, thereby requesting the group URI for delivery of presence information.

S1002: The group watcher 6 looks up the disclosure policy database 6-1 for authentication of the presence information delivery requester and decides whether to authorize the delivery of presence information.

S1003: If the delivery is authorized, the identifier (URI) of the application server 11 is registered in the subscriber information database 6-2.

FIG. 23 illustrates the flow of a process for registering presence information with respect to a group URI.

S1004: If the presence information is updated, the client 8 transmits a presence information notification message to the presence service server while specifying the group URI as a destination. The group presentity 5 receives the presence information notification message.

S1005: The identifier (URI) of the client from which the presence information notification message has been received is registered in the member information database 5-3.

S1006: The member information in the group URI presence cache 4-1 associated with the identified group URI is updated using the presence information received from the client. Where real-time service is called for, the group watcher may be notified of the update at this point of time.

S1007: The nesting information database 5-4 is looked up, and if it is found that the group URI is related with some other URI, the presence information notification message is forwarded to the URI registered in the nesting information database 5-4. In this case, for the entity having the URI to which the message is forwarded, the group presentity 5 acts as client. The presence information to be forwarded may be resource list information aggregated by the group URI.

FIG. 24 illustrates the flow of a presence information delivery process.

S1008: The group watcher 6 looks up the delivery policy database 6-3 to check the delivery frequency of the presence information and the notification method.

S1009: Following the delivery policy, the group watcher 6 looks up the group URI presence cache 4-1. The presence cache 4-1 may be looked up in a manner such that, for example, the presence information of all members (clients) registered with respect to the group URI is looked up once a minute, or that where a certain member in the group URI has been inquired, the presence information of this member alone is looked up in cooperation with the group presentity.

S1010: The subscriber information database 6-2 is looked up, and the presence information notification message is delivered to the identifier (URI) of the registered subscriber (application server 11).

Group Watcher User Agent 7 (FIG. 11)

The group watcher user agent 7 is an entity that requests the group URI for delivery of presence information and receives a list of presence information, in which the presence information from multiple clients is aggregated, from the presence service server. The group watcher user agent 7 comprises a subscription request function 7-1 for sending a message requesting the group URI for delivery of presence information, and a presence reception function 7-2 for receiving the list of presence information delivered thereto as a result of the subscription to the group URI.

Figure 25:
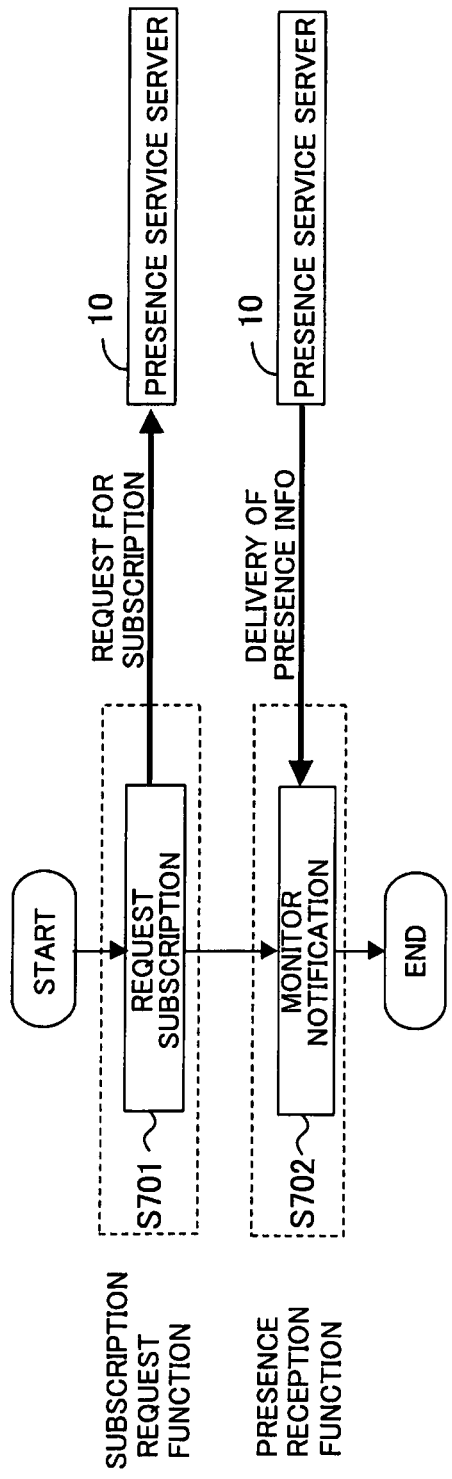
FIG. 25 is a flowchart illustrating a process executed by a group watcher user agent.

FIG. 25 illustrates the flow of process executed by the group watcher user agent.

S701: In order to acquire presence information, the application server 11 starts the group watcher user agent 7 and requests the group URI to deliver presence information. The provider of the service of the application server 11 can create and register a group URI with a view to collecting information. Where a group URI other than that created by the service provider is to be accessed, the application server may search the group URI directory server 9 to find the target group URI.

S702: A presence information notification message to be received from the presence service server 10 is monitored, and when a notification message is received from the presence service server 10, the presence reception function extracts the list of presence information from the received message and notifies the application of the list. A method of notifying an aggregation of multiple-client presence information is defined, for example, in draft-ietf-simple-event-list-07. In cases where the number of members included in the list is very large, the list of presence information may be transmitted in bit format or be compressed using some suitable compression technique before transmission. An effective method may also be employed wherein a complete list is delivered first and only a differential is delivered thereafter.

Figure 26:
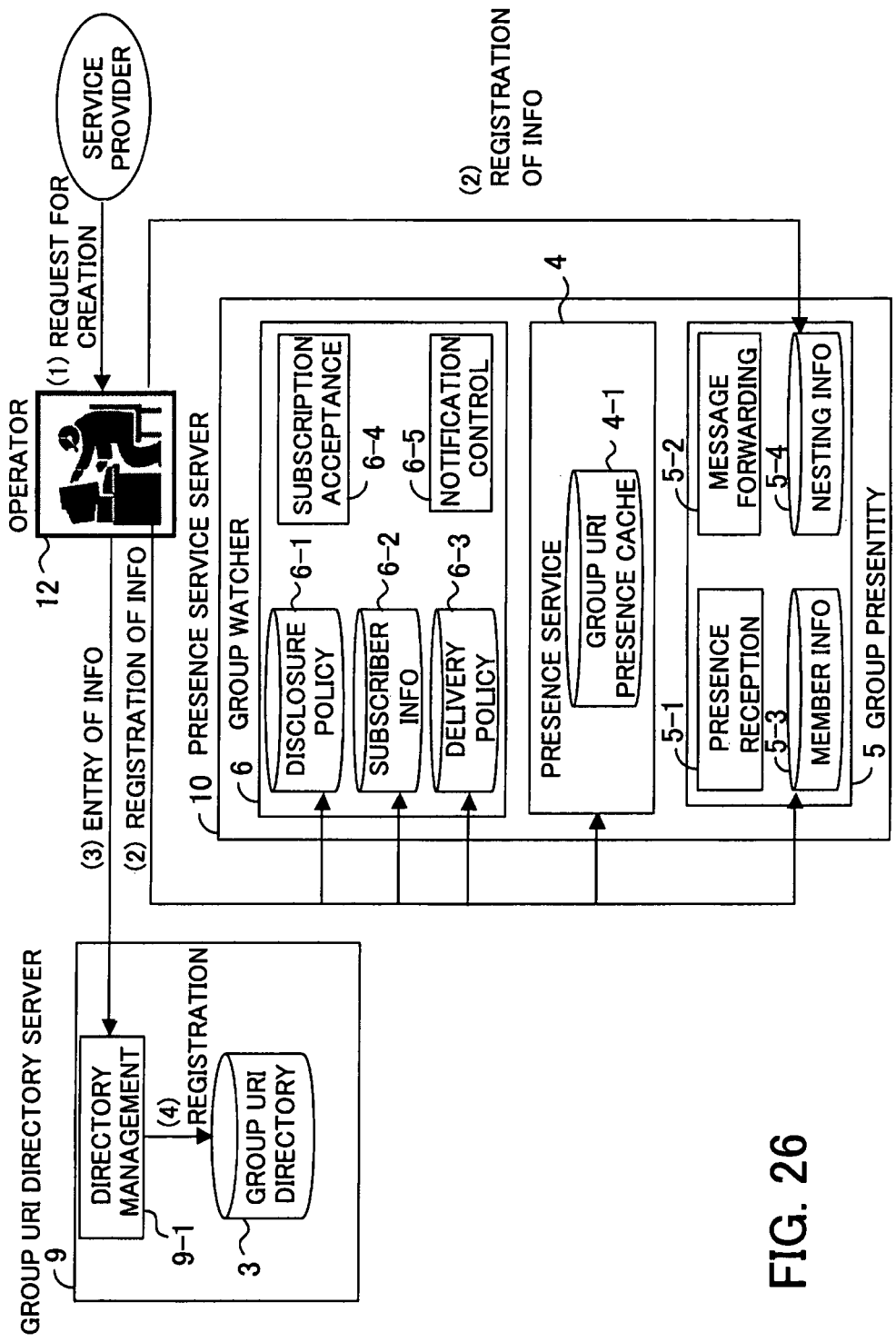
FIG. 26 is a sequence diagram illustrating a group URI generation process.

The following describes general process sequences of the presence communication system 1a and process flows of the aforementioned functional blocks. FIG. 26 illustrates the process sequence for group URI generation.

(1) A service provider (information deliverer or information provider) requests the operator 12 (administrator) of the presence service to create a group URI. As a procedure for requesting creation of a group URI, a service agreement may be concluded, or the operator function may be implemented by software so that the requester can enter the necessary information directly on the Web screen, or the requester may send electronic mail containing the necessary information. The information deliverer denotes a trader who refers to and modifies clients' presence information and delivers the presence information to clients, and the information provider denotes a trader who collects presence information from clients and provides the collected information to information deliverers.

(2) The operator 12 makes an entry of the requested group URI in the individual databases (disclosure policy database 6-1, subscriber information database 6-2, delivery policy database 6-3, group URI presence cache 4-1, member information database 5-3, and nesting information database 5-4) of the presence service server 10 and sets initial values. To make an entry in the databases, the administrator may input the necessary information on a maintenance screen.

(3) To enable the client 8 to use the newly created group URI, the operator 12 accesses the group URI directory server 9 and enters the necessary information on the management screen to register the group URI.

(4) The directory management function 9-1 of the group URI directory server 9 updates the group URI directory 3 (FIG. 21: S901 and S902).

Figure 27:
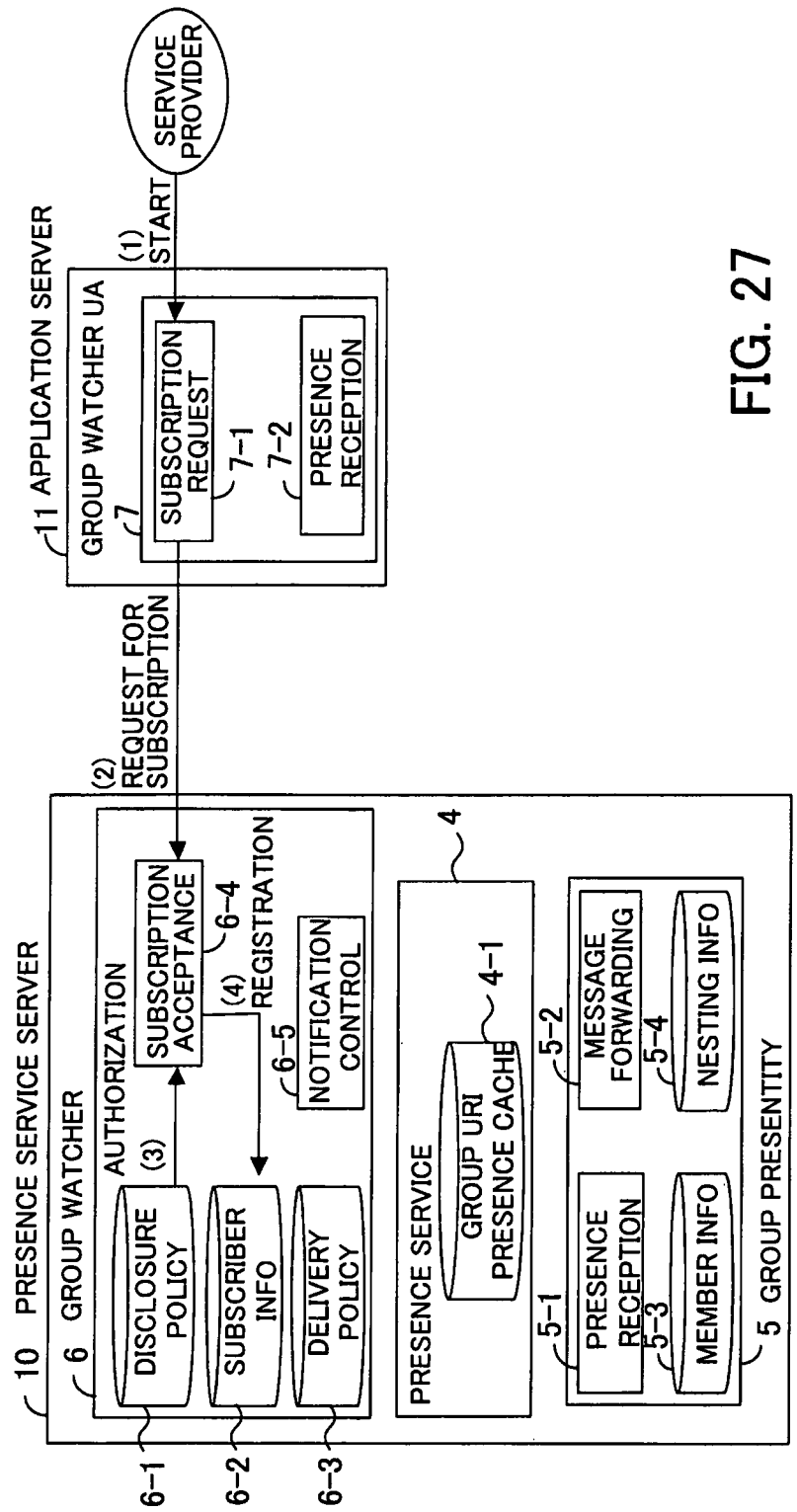
FIG. 27 is a sequence diagram illustrating the group URI subscription process.

FIG. 27 illustrates the process sequence for group URI subscription.

(1) The service provider starts the group watcher user agent 7 of the application server 11. To designate a group URI as the target of subscription, the group URI may be transferred as a parameter to the group watcher user agent 7 when the user agent is started (generated), or the group URI may be acquired in cooperation with the group URI directory server 9.

(2) The subscription request function 7-1 of the group watcher user agent 7 generates a presence information delivery request message and sends the generated message to a presence service server that manages the designated group URI. For the presence information delivery request message, a SUBSCRIBE message defined by RFC 2778 may be used. Alternatively, interconnectivity may be negotiated by using the extension for determining whether the list form of URI is supported or not, defined by draft-ietf-simple-event-list-07 (FIG. 25: S701).

(3) The group watcher 6 of the presence service server 10 receives the presence information delivery request message targeted to the group URI, and looks up the disclosure policy database 6-1 to determine whether or not the presence information delivery request is acceptable. Where a SUBSCRIBE message is used as the presence information delivery request message, the request may be authenticated using the sender's URI and message digest. The simplest rule to be adopted as the disclosure policy is to restrict the subscriber to the group URI creator only (FIG. 22: S1001 and S1002).

(4) If the presence information delivery request is acceptable, the URI of the presence information delivery requester (application server) is registered in the subscriber information database 6-2 (FIG. 22: S1003).

Figure 28:
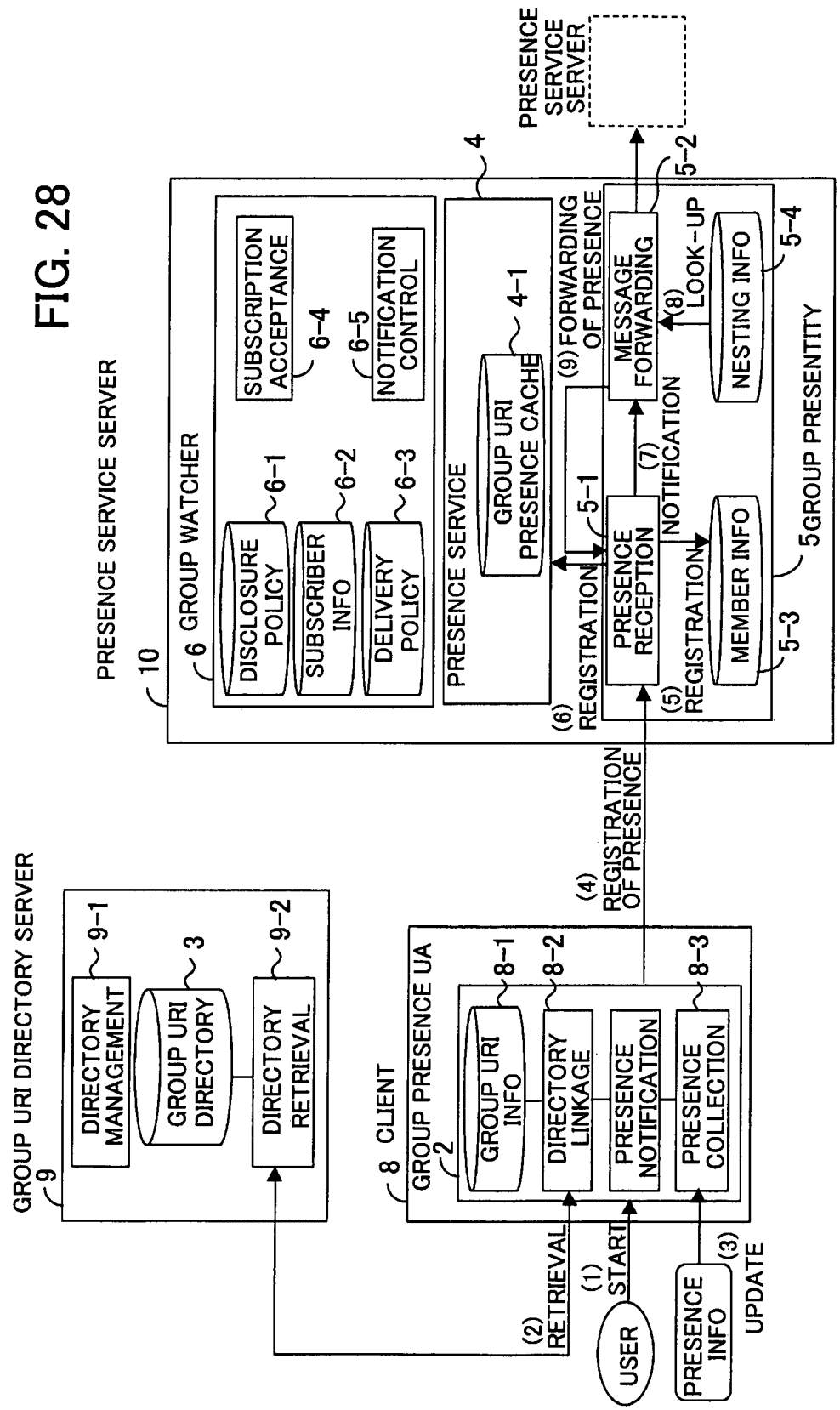
FIG. 28 is a sequence diagram illustrating the process of registering presence information with respect to a group URI.

FIG. 28 illustrates the process sequence for the presence registration with respect to a group URI.

(1) The user starts the group presence user agent 2 of the client 8.

(2) Using the group URI search screen provided by the client 8, the user specifies a group URI associated with his/her desired service. Selecting a group URI is analogous to looking up the Yellow Pages. As an example of the directory linkage function, client software may be provided which is integrated with a browser for displaying information (instant message, mail, Web screen, etc.) delivered via the group URI, such as messenger, mailer and chat, and which has the function of displaying the selected group URI on a GUI screen while at the same time indicating whether the group URI is valid or not, or the function of automatically selecting a group URI according to the time so that the destination may be switched (FIG. 20: S801 and S802; FIG. 21: S903 to S905).

(3) The client 8 monitors the presence information. As a presence monitoring method, the client may subscribe to the presence information of a different presentity or presentities, as disclosed in Japanese Unexamined Patent Publication No. 2004-228833, for example, or information may be manually input by a human, or the client may cooperate with sensors or the like so as to be automatically notified of numerical changes. Also, the present invention may be utilized in such a way that the presence information itself is the list of presence information registered by a different entity (FIG. 20: S803).

(4) When updating of the presence information is detected, the group URI is extracted from the group URI information database 8-1, and a presence information notification message containing the specified presence information is created. For the presence information notification message, a REGISTRATION message defined by RFC 3261 may be used, for example. Alternatively, a process such as the back-end subscription defined by draft-ietf-simple-event-list-07 may be utilized. In this case, however, the subscriber to the presence information must be a group presentity (or group watcher), and the presence information notification message must be sent to the group watcher as a subscriber. The presence information notification message must not be sent to a subscriber to RLS (resource list server) mentioned in draft-ietf-simple-event-list-07. The distinction arises out of the difference in whether the information aggregated by the group URI is directed to a particular individual or is shared (FIG. 20: S804 to S806).

(5) The group presentity 5 of the presence service server 10 receives the presence information notification message sent from the client 8 and targeted to the group URI, and adds the sender of the presence information notification message to the member information database 5-3 as a registered member of the group URI. Alternatively, when the group URI is generated, information about registrable members may be registered in the member information database 5-3 so that only the permitted members may be allowed to provide their presence information (FIG. 22: S1004 and S1005).

(6) The group presentity 5 of the presence service server 10 extracts the presence information from the presence information notification message, and updates the presence information of the member entry of the corresponding group URI, stored in the group URI presence cache 4-1 (FIG. 23: S1006).

(7) The group presentity 5 of the presence service server 10 notifies the message forwarding function 5-2 of the presence information notification message.

(8) The group presentity 5 of the presence service server 10 looks up the nesting information database 5-4 to determine whether or not there is a URI related with the group URI. Such URI may be a URI identifying an ordinary single presentity or some other group URI (FIG. 23: S1007).

(9) If a related URI exists, the group presentity 5 of the presence service server 10 forwards the presence information notification message to the related URI. The forwardee may be either or both of a different presentity of the same presence service server and a presentity of a presence service server of a different management domain.

Figure 29:
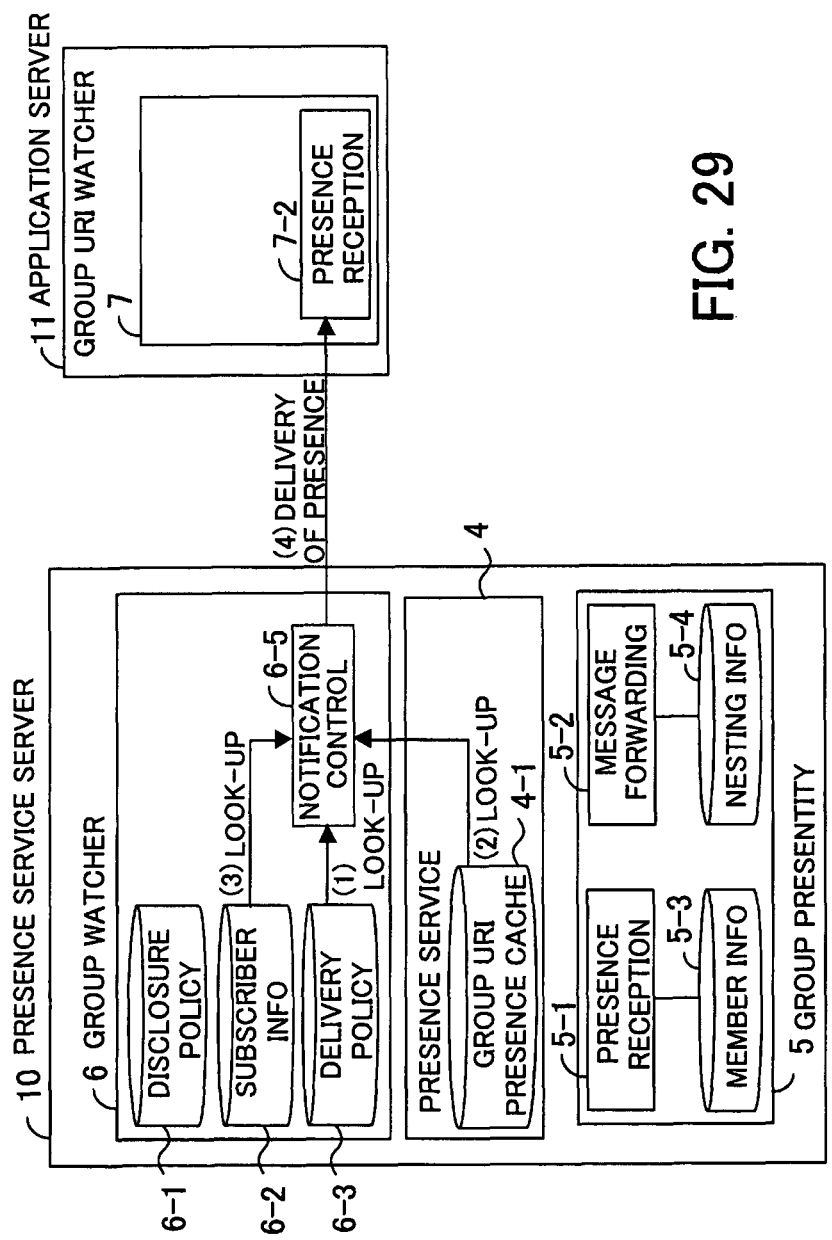
FIG. 29 is a sequence diagram illustrating a process of delivering presence information of a group URI.

FIG. 29 illustrates the process sequence for the delivery of group URI presence information.

(1) With respect to each group URI via which the presence information is subscribed, the group watcher 6 of the presence service server 10 extracts information prescribing the delivery method for the group URI, from the delivery policy database 6-3. The delivery policy may require delivery at intervals of 30 minutes for non-real-time service or require immediate delivery upon change in the presence information for real-time service. For example, the delivery policy may be formulated utilizing the advantage of storing the presence information of multiple members such that the delivery policy is dynamically modified in accordance with the presence information of a key member. Specifically, in the case of a group URI collecting presence information about location, for example, the delivery method may be dynamically changed such that the presence information of those members whose presence information is the same as that of a key member (members in the same place as the key member) is delivered in real time while the presence information of the other members is delivered at intervals of 30 minutes, thereby reducing the traffic as a whole. Also, since the present invention permits the client 8 to register its presence information directly with respect to the group URI, the notification control function of the presence service server 10 may be adapted to negotiate with the group presence user agent 2 of the client 8 about the notification interval of presence information, to thereby vary the frequency of presence information notification messages. Suppose, for example, that certain presence information is updated every minute but the delivery policy associated with the group URI in question demands delivery at intervals of 30 minutes, and in this case, 29 notifications of the presence information are useless. With respect to such group URI, the notification interval may be changed such that the presence information is registered at the frequency of once per 30 updates. Configuring the system in this manner makes it possible to further reduce the traffic as a whole (FIG. 24: S1008).

(2) In accordance with the delivery method specified in the delivery policy database 6-3, the group watcher 6 of the presence service server 10 queries the group URI presence cache 4-1 and generates a presence information delivery message. This means that if the delivery interval is once in every 30 minutes, for example, a query is made at intervals of 30 minutes. Conversely, in cases where real-time delivery is demanded, the presence reception function 5-1 of the group presentity 5 has to be configured such that when the group URI presence cache 4-1 is updated, the presence reception function also notifies the notification control function 6-5 of the group watcher 6 that the group URI presence cache has been updated, to thereby enable immediate delivery (FIG. 24: S1009).

(3) The group watcher 6 of the presence service server 10 looks up the subscriber information database 6-2 to identify the member subscribing to the group URI (FIG. 24: S1010).

(4) The group watcher 6 of the presence service server 10 sends the presence information delivery message to the subscribing member. For the presence information delivery message, a NOTIFY message defined in RFC 2778, for example, may be used in combination with a multiple presence information notification method such as RLMI defined in the draft of event list (FIG. 25: S702).

Figure 30:
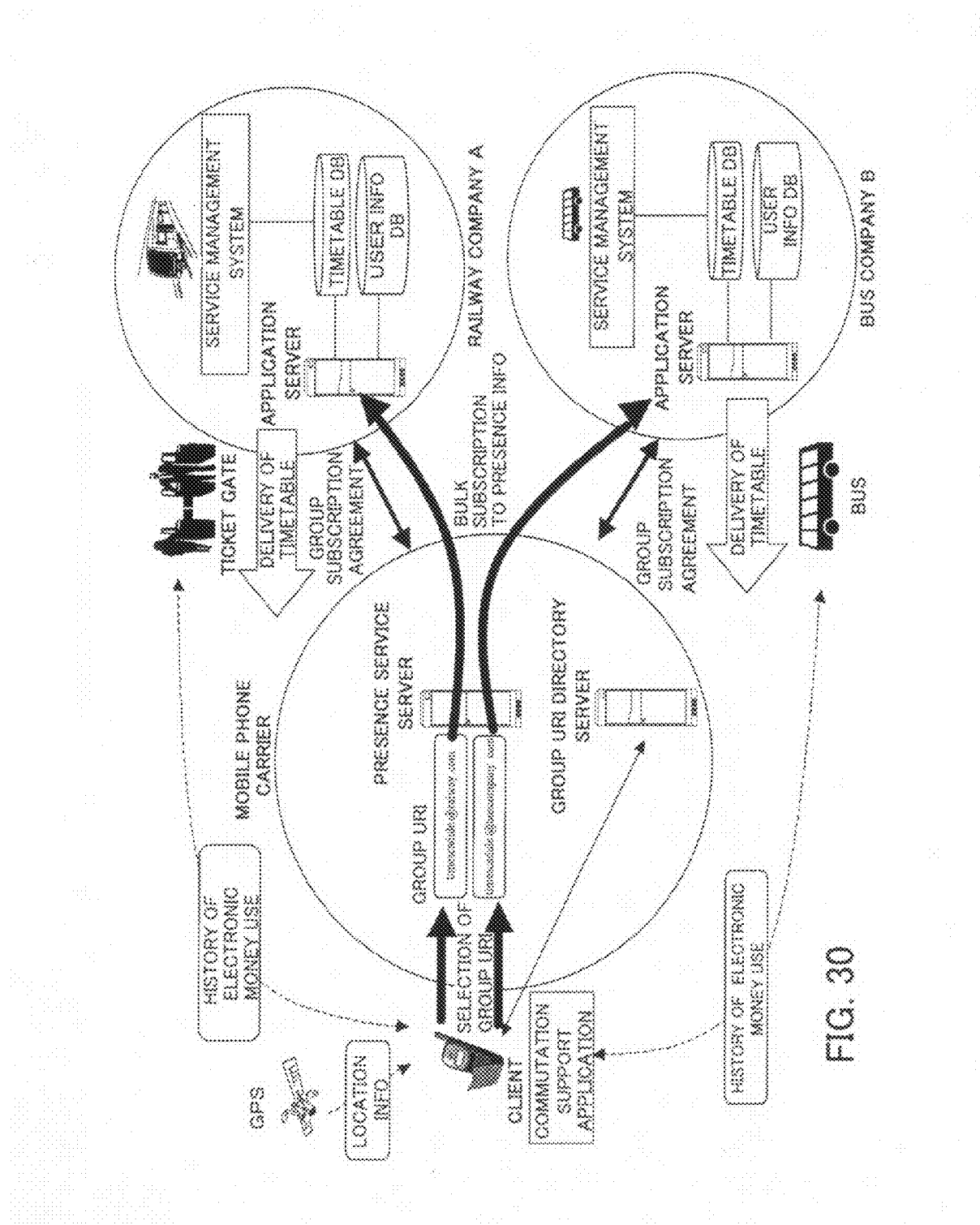
FIG. 30 illustrates a timetable delivery service.

Exemplary services utilizing the presence communication system 1*a* will be now described. FIG. 30 illustrates a timetable delivery service as a sample of such services, wherein information of public transport facilities is delivered to users' mobile terminals to help users commute or make a trip. The convenience of buses and trains will greatly improve if users are notified of the timetables and current service status of trains and buses in real time shortly before the time the users are scheduled to use the bus or train. Also, in cases where users are transferring from a bus to a train or from a train to another train, it will be very convenient for the users if, after getting on the bus or train, the users are automatically notified of the guidance on the next transportation or the delivery of information automatically stops.

To provide such service, it is necessary that information be delivered taking account of the users' status and purpose. In the presence service defined by RFC 2778, however, notification of presence information is initiated after the entity who needs the presence information (in this instance, the service provider who delivers information) requests the users to notify their presence information. Accordingly, in order to have the users' status and purpose reflected in the service, the system of the service provider needs to be configured such that the users' presence information is received at all times and that information is delivered only when the users' specified conditions are fulfilled.

Configuring the service provider's system in this way, however, leads to significant increase in processing load associated with the collection and management of the presence information from the individual users, and where the number of users is large, enormous resources are required to collect information. Also, each user's purpose needs to be fulfilled by different service providers, giving rise to the difficulty of linking the deliveries of information with one another, such as from the delivery of railway service information to the delivery of bus service information.

The following describes an exemplary case where the above system is configured using the functionality of the present invention, wherein the system supports a user who takes the train and the bus to go to the office. The user has a mobile phone with GPS and electronic money functions and uses the phone to receive the service. Information deliverers are, in this case, a railway company A and a bus company B, and information collecting groups timescadule@raiway.com and timescadule@buscompany.com for providing respective services are created and disclosed on the directory server of an information collector (mobile phone carrier). The information collector provides the group URI client function of the present invention as mobile phone software or as a function of the presence server that provides presence service to mobile phones. To support the service, the client has the function of recognizing the user's specified time, the present location and the history of use of electronic money, and controlling the registration of presence information with respect to the group URIs. Let it be assumed that usually the user leaves his/her home at around 8:00 a.m. and takes the train and then the bus to go to the office, and also that the user usually leaves the office at around 8:00 p.m. and takes the bus and then the train to go home. In such cases, the user will want to be provided with information about the timetable and service status of the train for the period of about 10 minutes after 8:00 a.m. and, after taking the train, information about the timetable and service status of the bus. Similarly, the user will want to be provided with information about the timetable and service status of the bus for the period of about 10 minutes after 8:00 p.m. and, after taking the bus, information about the timetable and service status of the train.

As distinct from common simple forms of information delivery service, the information delivery service using the presence information is expected to be able to flexibly cope with various situations where, for example, the user leaves his/her home or the office at different times than usual or the user is on a business trip and thus is at a different place. The following describes the procedure for executing the service.

(1) The user accesses the directory service provided by the mobile phone carrier to search for the group URIs of the railway and bus companies A and B, and loads the group URIs into the group URI client. The group URI client is, for example, a Java (registered trademark) application, and the group URI information is retrieved through a mobile phone browser such as the i-mode (registered trademark) by making a selection etc. on a Web service screen linked with the directory service.

(2) The group URI client is configured so as to permit the user to register and refer to the conditions for initiating the individual information deliveries. For example, the start time, location, event, etc. can be set as the conditions. The user registers necessary information in accordance with his/her schedule, as shown in FIG. 31.

FIG. 31 exemplifies registration of events. In the illustrated example, the payment of electronic money is used as a starting or ending event. Specifically, the group URI client is configured such that when the electronic money is paid at the ticket gate of a station or on a bus, the group URI client identifies the payee from the electronic money reader or the log of past purchases, in cooperation with the electronic money application, to detect the use of the railway or bus service. Also, the group URI client is configured so as to be able to detect the designated location, such as the user's home or office, from the location information provided by the GPS or the cell of a base station. There are a variety of methods for collecting presence information (in this instance, history of use of electronic money, location information, etc.) by the group URI client, and also there are various methods for allowing users to specify conditions. The illustrated example is just one form of implementing the service, and the present invention is not limited to this example alone. In other words, the group URI client in the illustrated example is configured to collect three presences of time, use of electronic money and location, but the means of collecting such presences is not particularly limited.

(3) The group URI client constantly compares the collected presences with the conditions registered by the user. If the time 8:00 a.m. is reached and the detected location indicates the user's home, then the condition (a) is fulfilled, whereupon the group URI client begins to send the present location to the destination group URI timescadule@raiway.com. The group URI client transmits the present location to timescadule@raiway.com periodically or each time the location changes.

(4) The information delivery application of the railway company A periodically looks up the information collected to timescadule@raiway.com. After 8:00 a.m., the user's presence begins to be reflected in the presence list of timescadule@raiway.com. Thus, the information delivery application (corresponding to a presence server that also executes the service) identifies the nearest station and the train, based on the user ID specified in the presence list, the location information and information on the user's route registered beforehand by the user in the information delivery application of the railway company A, and delivers timetable information by looking up the timetable database. Where the timetable database of the railway company A is configured so as to reflect the current train service status, information on the service status may be delivered as well.

(5) When the user passes through the ticket gate of the station while using electronic money, the group URI client generates an event "passing through gate". The event may be generated when the electronic money is paid at the ticket gate, for example, by using the history of fare payments to the railway company. The occurrence of the event "passing through gate" fulfills the terminating condition for (a) as well as the starting condition for (b), and therefore, the group URI client switches the destination of the presence information from the group URI timescadule@raiway.com of the railway company A to timescadule@buscompany.com of the bus company B. To notify the group URI timescadule@raiway.com of the railway company A that the notification of presence information has been stopped, the group URI client may transmit an explicit notification to the presence server, or the presence server may be so configured as to automatically terminate the delivery of information if the presence information is not registered within a refresh interval. This inactivates the registration of the user's presence information with respect to the group URI timescadule@raiway.com of the railway company A, so that the delivery of information from the railway company A stops. Namely, the delivery of the train timetable is stopped as soon as the user passes through the ticket gate. On the other hand, registration of the user's presence information with respect to the group URI timescadule@buscompany.com of the bus company B is started, and accordingly, the bus company B starts to deliver information about the bus timetable to the user, as in the case of the delivery of the train timetable information from the railway company A. Also, once the user boards the bus (while paying electronic money at the reader on the bus), the delivery of the bus timetable information is stopped.

(6) When the user goes home, the service is provided in like manner. Specifically, when 8:00 p.m. is reached and if the user is at the office, information on the bus timetable is delivered, and after the user boards the bus, information on the train timetable is delivered.

(7) With the system configured as described above, the information provider need not monitor the user status one by one; instead, the user himself/herself notifies the information provider of his/her status only when the information is needed, in order to receive the service. In the above example, the information provider has to learn the user status only twice a day. In the system defined by RFC 2778, by contrast, the information provider needs to monitor the user status and, therefore, must keep processing those user status notifications which are useless to the information provider, besides the two notifications in response to which the information is delivered. By using the functionality of the present invention in configuring a system, it is possible to release the system from the load of monitoring the user status that has no connection with the provision of service and thus to reduce wasteful consumption of the network resources.

Figure 32:
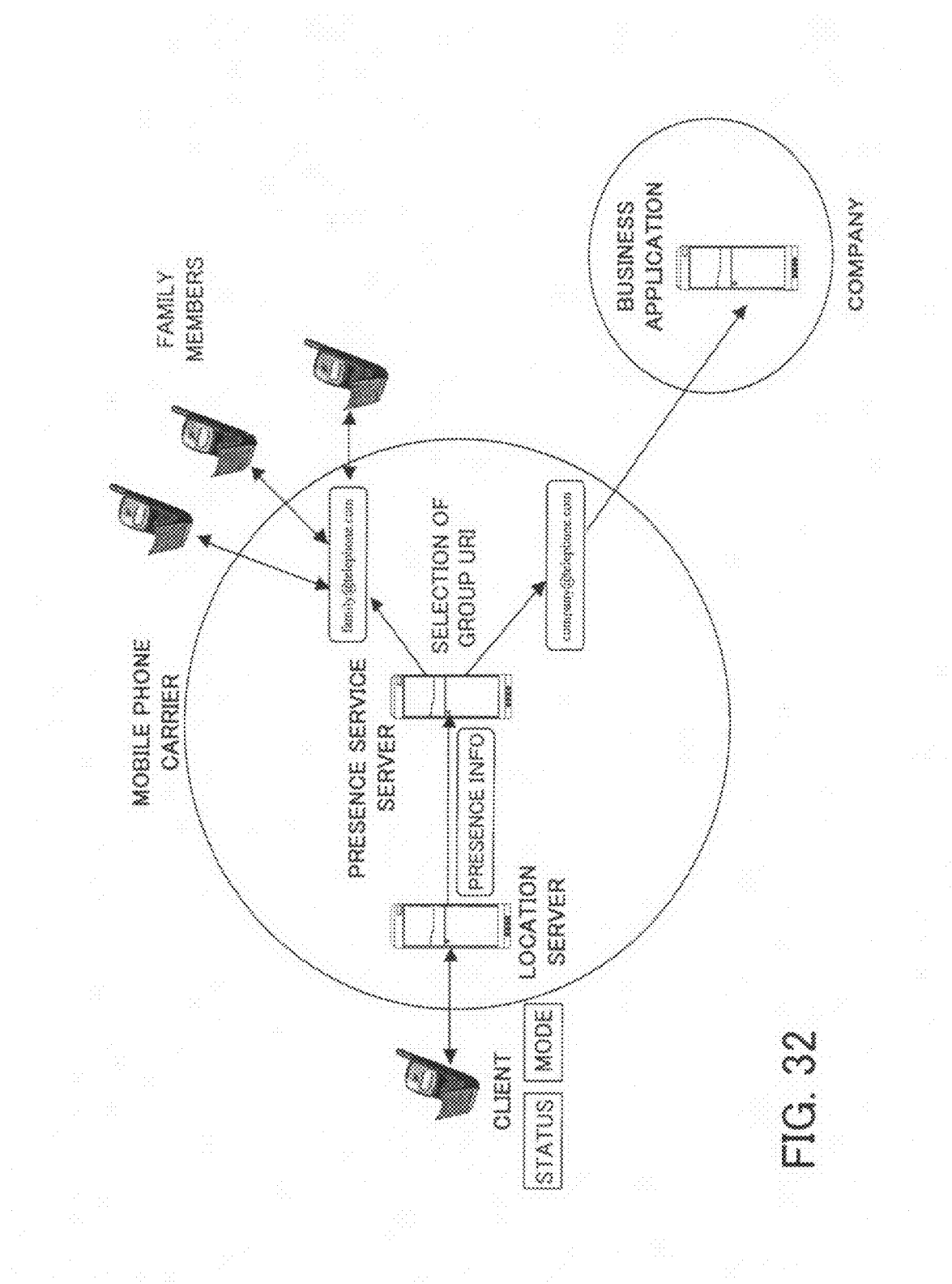
FIG. 32 illustrates a service of switching presence information recipients according to modes.

FIG. 32 illustrates a service of switching recipients of presence information in accordance with modes. As another form of service, let us consider an exemplary case where the user communicates his/her status to the company for which the user works as well as to his/her family members for convenience of contact. Like the first example of service described above, it is assumed that the user has a mobile phone as a device for communicating his/her presence. Where the service is implemented by the method defined in RFC 2778, the mobile phone carrier provides presence service such that the user notifies his/her presence information at the request of a family member or the company's business administration application. The user may possibly not wish to communicate his/her presence information to the company during the time other than the working hours, but it is difficult in practice to configure the company's business administration application such that the application determines whether to request the user's presence information or not by looking up the user status. While the notification of the presence information is suspended, the application has no way to judge whether the user is in a private status or not. It is possible to configure the client software so as to determine the user status as well as the recipient of presence information and transmit different status information to the company and the family members in accordance with the determination result (namely, dummy information is sent to the company during the off-duty time). However, the presence information notified while it is not needed must be continuously processed, as in the first example of service.

To provide the service by using the functionality of the present invention, the system may be configured as described below.

(1) The user creates the group URI family@telephone.com for purposes of contact with the family members. The mobile phone carrier allows the user to create such a group URI as its supplementary service, for example, which likely enables the family members to look up one another's status free of charge. On the basis of the agreement with the user, the mobile phone carrier creates and manages the group URI.

(2) The company may have its own presence server that manages the user status in cooperation with in-house extension telephones. It is also likely that the company outsources the presence server from the mobile phone carrier so that the mobile phone owned by the user can be used also as an extension telephone of the company. In either case, the company creates the group URI company@telephone.com as an ingress of presence information sent from mobile phones, and registers the created group URI with the mobile phone carrier.

(3) To implement the presence service, the mobile phone carrier configures the presence server such that when locating the user's mobile phone by radio waves, for example, the server causes the mobile phone to send the user's registered status, thereby collecting the user's presence information. The presence server managed by the mobile phone carrier is equipped with the group URI client function of the present invention. When making an agreement with the mobile phone carrier, the user chooses to receive the family presence service and requests that his/her presence information be forwarded to the group URI of the company for which the user works. To allow the mode to be switched between a private mode and a business mode, a mode button is provided on the mobile phone, for example, so that when the mode button is pressed, the active mode may be communicated to the presence server. Alternatively, the mode itself may constitute the presence information and may be registered when requested.

(4) The group URI client function of the presence server is so configured as to follow a logic such that in the business mode, the presence information is delivered to both of the private group URI family@telephone.com and the company's group URI company@telephone.com, and in the private mode, the presence information is delivered only to the private group URI family@telephone.com.

(5) An application for providing presence information is started in the mobile phone owned by the user. The application is configured so as to allow the user to select a status on the screen of the mobile phone or to change the status displayed on the screen each time a status button is pressed.

(6) Let us suppose that the user switches the mode to the business mode and changes the status to "attending meeting". The mode and the status are recorded in memory of the mobile phone, and when the location of the mobile phone is checked via a base station by using radio waves, the memory is looked up and the mode and the status are sent as response information.

(7) A location server of the mobile phone carrier extracts the mode and the status from the response information and registers the user's presence, thus acting as presence service client.

(8) Following the sorting logic explained in (4) above, the presence server of the mobile phone carrier delivers the presence information to the group URI(s). In this instance, the active mode is the business mode, and therefore, the status "attending meeting" is delivered to both of the private group URI family@telephone.com and the company's group URI company@telephone.com. The private group URI family@telephone.com is a group URI where the presences of all family members are collected and shared by the user's family members only. Any member of the family can learn the status of all family members by requesting the group URI to deliver the presence information. On ascertaining that the user is currently attending a meeting, the family member will decide to refrain from making contact with the user unless the information to be conveyed is urgent. On the other hand, the company's group URI company@telephone.com is a group URI where the presence information is shared by the colleagues of the company. A colleague with whom one is cooperating in business very often changes, and thus if each colleague has to request the other colleague's presence information, then frequent change of members will be required. The group URI company@telephone.com is a URI intended for information sharing and enabling the members to register their presence information. By requesting the group URI to deliver presence information, the user can acquire the information of all members concerned, making it unnecessary to change members each time the need arises.

(9) Let us suppose that the user switches the mode to the private mode and changes the status to "free".

(10) The presence information is sent to the presence server in the manner already explained above, and the status "free" is communicated only to the private group URI family@telephone.com. The status "off duty", for example, may be sent to the company's group URI company@telephone.com so that the presence information may not be requested until the user again switches the mode to the business mode.

As seen from the aforementioned two examples of service, the group URIs are created for purposes of information delivery or information sharing, and the user sends his/her presence information to a desired group URI or URIs that meet the user's needs. It is therefore possible to provide lightweight yet flexible information delivery and sharing services reflecting the users' status, that are difficult to implement in existing information delivery service systems.

Also, by introducing the mechanism whereby the presence information provider is allowed to voluntarily select the target of registration of his/her presence information, it is possible to have the user agree in advance to the sharing of the presence information, as distinct from existing mechanisms wherein service is executed after a presence information viewer subscribes to the service. Thus, the presence information can be shared by multiple users, making it possible to efficiently reduce the number of messages exchanged in a large-scale event notification system. Consequently, the system can be expanded into a larger-scale information delivery service system of which the provision of service is not restricted solely by the users' awareness and thus which can provide users with value-added service using the presence information, for example, in return for the disclosure of the presence information.

Figure 33:
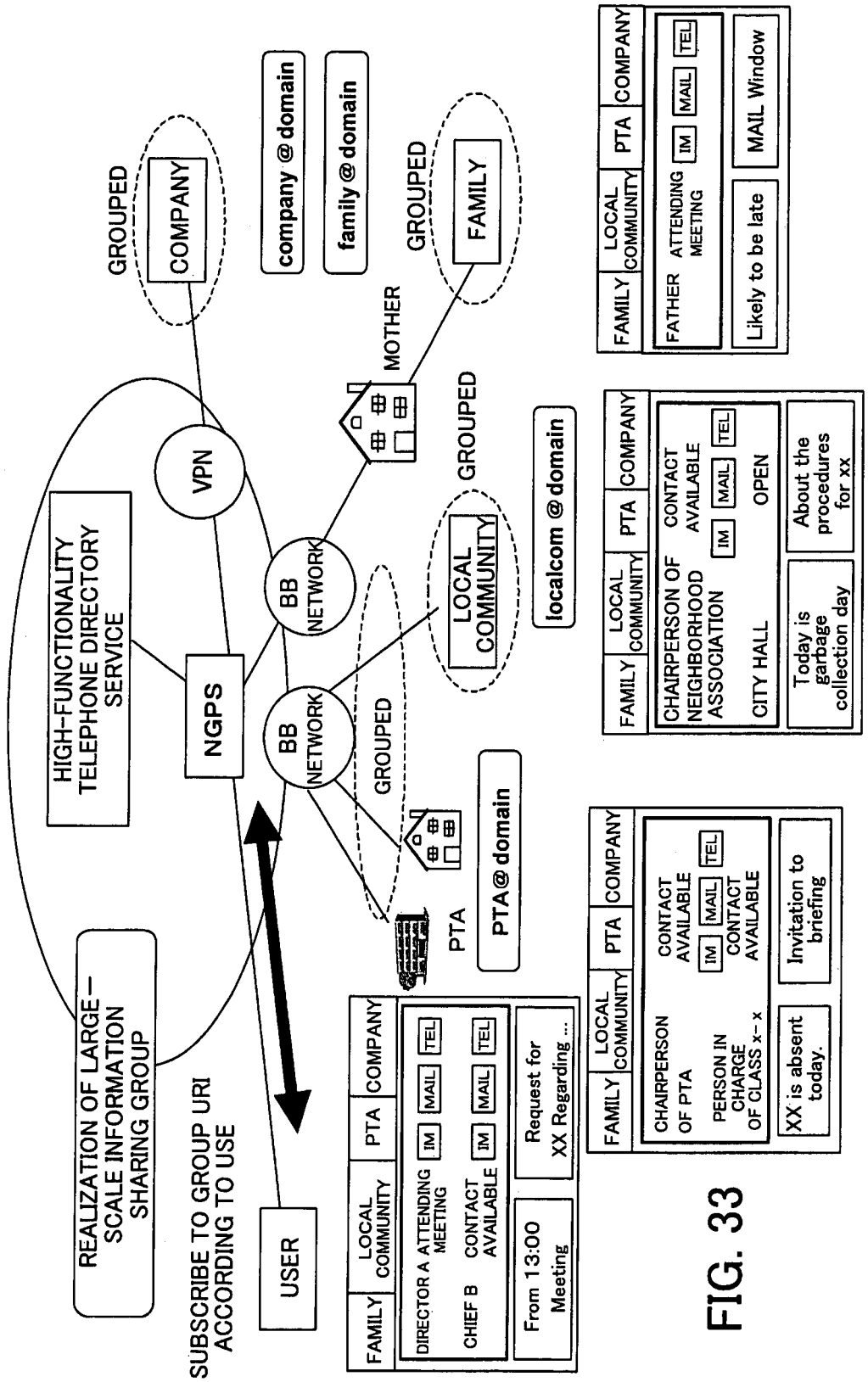
FIG. 33 illustrates an exemplary application of the system to communication groups.

The following describes three other examples of service to which the present invention is applied. FIG. 33 exemplifies a service wherein the invention is applied to communication groups. Group URIs are created respectively for the family, local community, PTA, and company. In cases where the user's living environment has changed because of removal, for example, the user has only to subscribe to the group URI of the new local community, PTA or company, to allow the persons concerned to easily contact the user.

Figure 34:
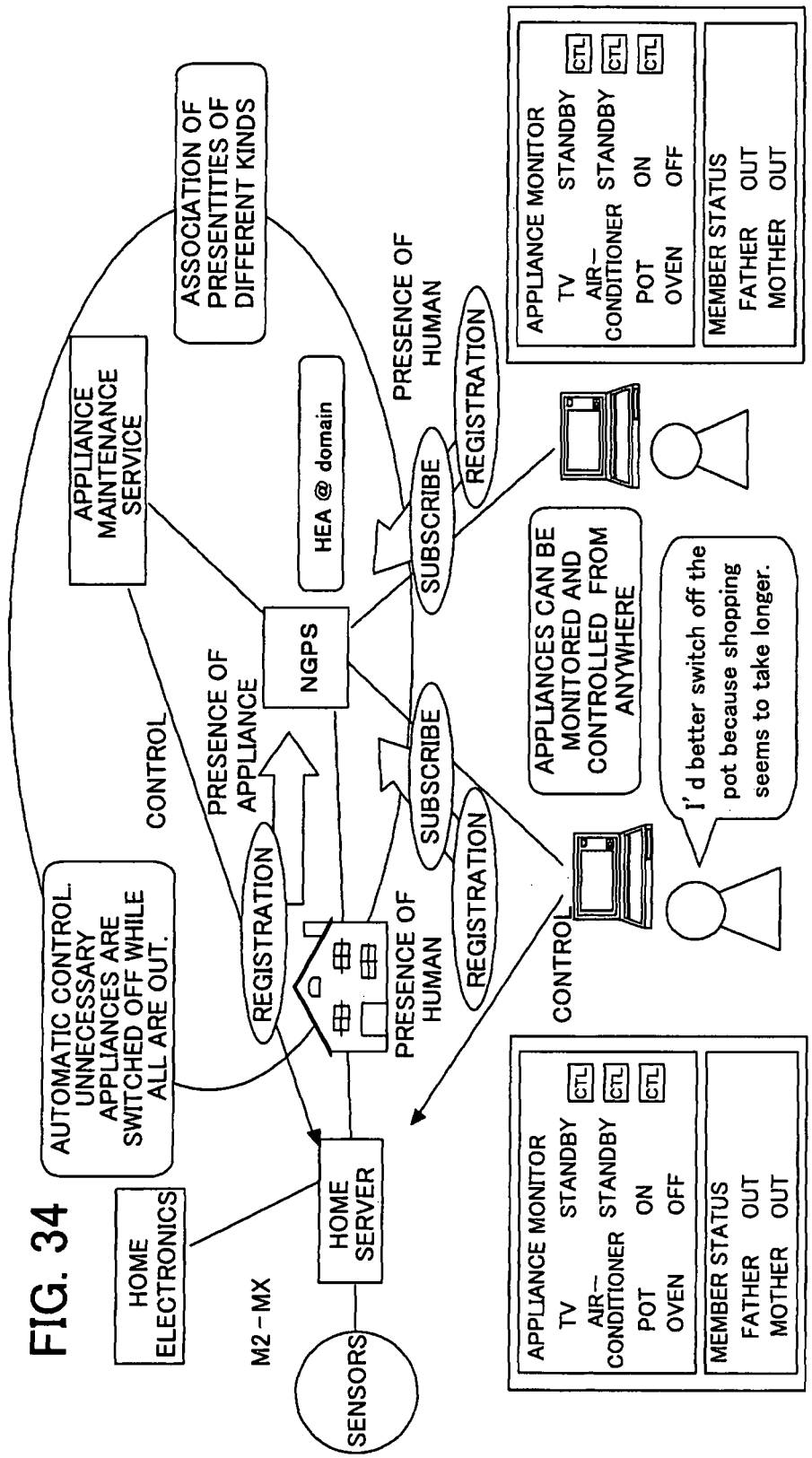
FIG. 34 illustrates an exemplary application of the system to monitoring of the status of household electrical appliances.

FIG. 34 exemplifies another service wherein the present invention is applied to monitoring of home electronics. A group URI is created for the group consisting of family members and household electrical appliances and enables each family member to check the status of the family members (out or at home) as well as the status of the electrical appliances at the same time. Accordingly, a family member can confirm whether any appliances, such as a pot or heating apparatus, remain switched on or not while all family members are out, for example.

Figure 35:
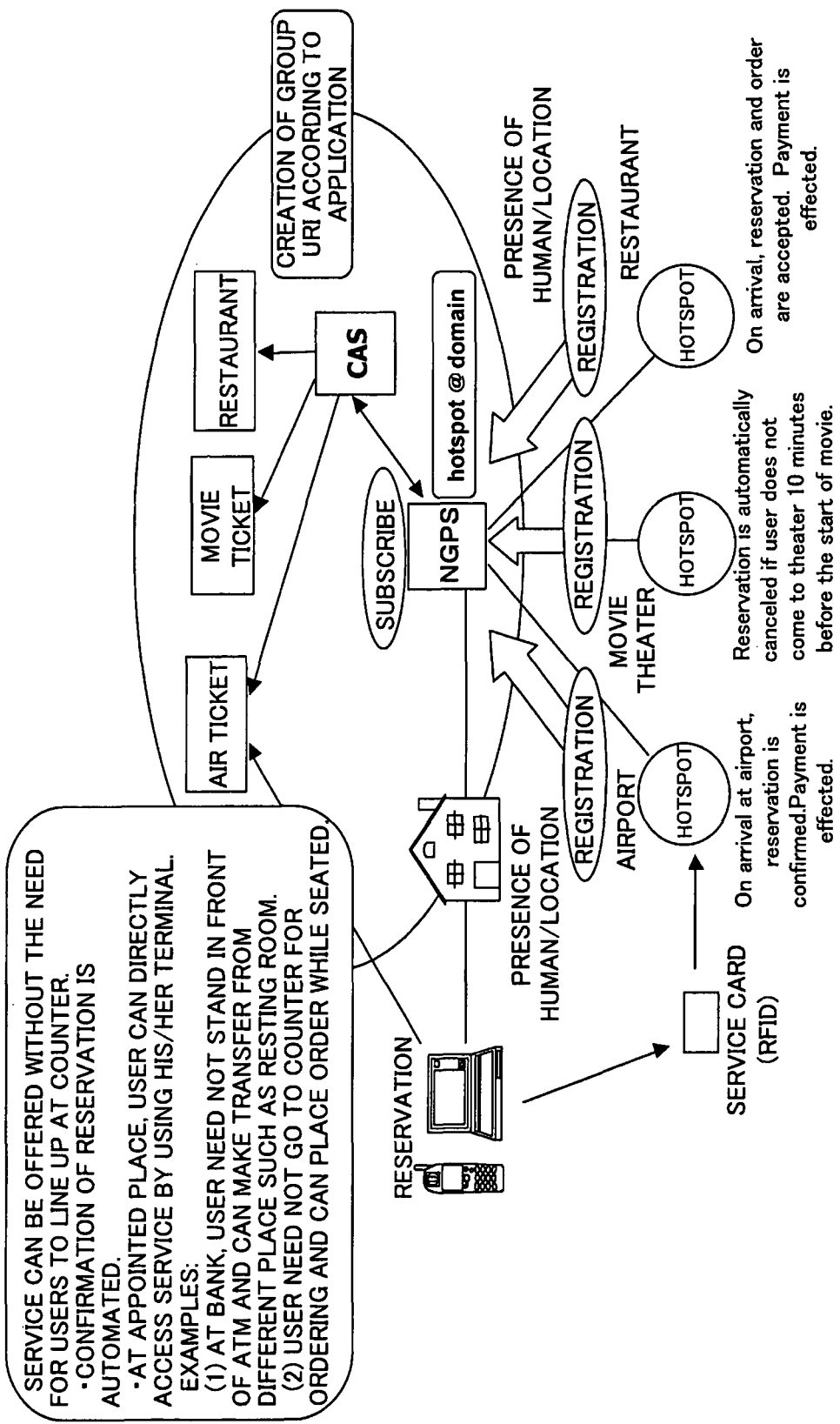
FIG. 35 illustrates an exemplary application of the system to reservation services linked with hotspots.
Figure 36:
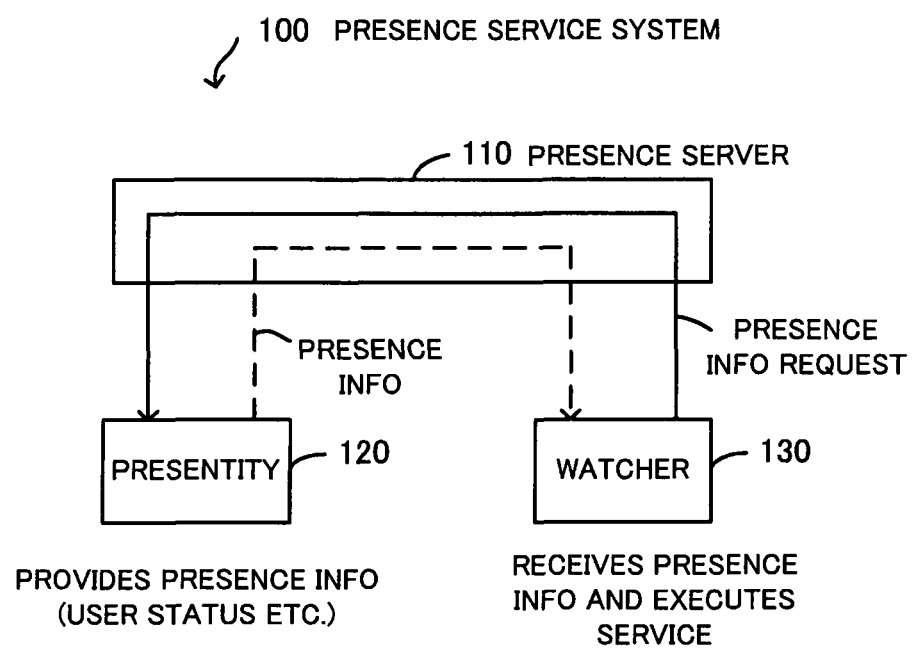
FIG. 36 illustrates an overview of a presence service system.

FIG. 35 illustrates still another example wherein the present invention is applied to reservation services liked with hotspots. A group URI is created for the group of multiple wireless LAN coverage areas (hotspot coverage areas) to provide users with various services on the basis of the presence information registered from the individual hotspots. This form of application makes it possible to provide a service whereby, for example, the user can make a reservation on the Internet, payment is effected if the user comes to a given place, and the reservation is automatically canceled if the user does not show.

In the presence communication system of the present invention, the presence server has group identifiers with respect to each of which multiple pieces of presence information provided by presentities are aggregated and stored, and the presence information requested to the group identifiers by watchers is delivered to the corresponding watchers. Thus, even if the number of presentities and watchers increases and the system becomes large in scale, the number of messages exchanged can be kept small, making it possible to prevent lowering in communication quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A presence communication system for executing service after presence is carried out to check status of a target of communication before initiation of communication, comprising:

a presence server having a group identifier as an identifier which is used to collectively look up a group of multiple pieces of presence information provided by multiple presence information providers who have agreed to a use policy, the presence server aggregating and storing the presence information under the group identifier and delivering the presence information requested to the group identifier;

presentities which have agreed to the use policy of the multiple pieces of the presence information, as presence information-providing clients, to provide the presence server with presence information targeted to the group identifier; and watchers which have agreed to the use policy of the multiple pieces of the presence information, as presence information-requesting clients, to request the group identifier for the presence information provided by the presentities, and receive the presence information delivered from the presence server, at least one of the watchers forming a single group assigned the group identifier with the presentities, wherein the presence server sets a plurality of different group identifiers, the presentities provide the presence information to the respective different group identifiers, and the presentities each have a function of selecting one of the group identifiers and determine, with respect to the presence server, provision/non-provision or notification interval of the presence information, based on content of the presence information and a provision policy according to which the presence information is provided to the group identifiers;

wherein the presentities included in the group transmit the presence information only once to the presence server while specifying the group identifier, and when the presence information is requested from the watchers, the presence server delivers the multiple pieces of presence information collectively to the watchers included in the single group;

wherein the presence information stored under lowest-level group identifiers is aggregated successively to higher levels of a hierarchical structure such that all of the presence information is aggregated and stored under a highest-level group identifier;

wherein the presence server has a plurality of group identifiers arranged in the hierarchical structure, and the presence server successively curtails the presence information as the presence information is aggregated from lower to higher levels of the hierarchical structure such that higher-level group identifiers hold smaller amounts of information; and wherein the presence server changes a delivery policy in accordance with the presence information of a key member and delivers in real time the presence information of members whose presence information is the same as that of the key member and delivers at intervals the presence information of the other members.

2. The presence communication system according to claim 1, wherein the presence server has first and second group identifiers, multiple pieces of presence information are aggregated under the first group identifier, and all or part of the aggregated presence information is communicated to the second group identifier, to allow the presence information to be registered simultaneously under the first and second group identifiers.

3. The presence communication system according to claim 1, further comprising a group identifier directory server including a group identifier directory permitting the presentities to search for information about the group identifiers, wherein the group identifier directory server discloses, to the presentities, guidance on use of services provided via the group identifiers.

4. The presence communication system according to claim 1, wherein the presence server includes a receiver for receiving the presence information sent from the multiple presentities to the group identifiers, a group identifier database for storing the received presence information in a form of list including pairs of information each comprising an identifier of the presentity and the presence information, and a deliverer for receiving a presence information delivery request sent from any one of the watchers to one of the group identifiers, and delivering the list of the presence information to the watcher from which the presence information delivery request has been received.

5. The presence communication system according to claim 1, wherein the presentities each select one of the group identifiers to which the presence information is to be provided, select and edit the presence information to be sent to the selected group identifier, and send the obtained presence information while specifying the selected group identifier as a destination.

6. A presence communication method for executing service after presence is carried out to check status of a target of communication before initiation of communication, comprising:

generating, by a presence server, a group identifier for collecting presence information;

registering, by a directory server, the group identifier together with service guidance information;

searching, by each of presentities which have agreed to the use policy of the multiple pieces of the presence information, the directory server for a group identifier providing a desired service, and providing presence information to the group identifier;

aggregating, by the presence server, and storing the presence information provided by the presentities and targeted to the group identifier;

requesting, by each of watchers which have agreed to the use policy of the multiple pieces of the presence information, the group identifier for the presence information provided by the presentities;

delivering, by the presence server, to each of the watchers, the presence information requested to the group identifier; and receiving, by each of the watchers, the delivered presence information, recognizing status of the presentities, and executing service with respect to presentities to which the service can be provided, wherein at least one of the watchers forms a single group assigned the group identifier with the presentities, wherein the presence server sets a plurality of different group identifiers, the presentities provide the presence information to the respective different group identifiers, and the presentities each have a function of selecting one of the group identifiers and determine, with respect to the presence server, provision/non-provision or notification interval of the presence information, based on content of the presence information and a provision policy according to which the presence information is provided to the group identifiers;

wherein the presentities included in the group transmit the presence information only once to the presence server while specifying the group identifier, and when the presence information is requested from the watchers, the presence server delivers the multiple pieces of presence information collectively to the watchers included in the single group;

wherein the presence information stored under lowest-level group identifiers is aggregated successively to higher levels of a hierarchical structure such that all of the presence information is aggregated and stored under a highest-level group identifier;

wherein the presence server has a plurality of group identifiers arranged in the hierarchical structure, and the presence server successively curtails the presence information as the presence information is aggregated from lower to higher levels of the hierarchical structure such that higher-level group identifiers hold smaller amounts of information; and wherein the presence server changes a delivery policy in accordance with the presence information of a key member and delivers in real time the presence information of members whose presence information is the same as that of the key member and delivers at intervals the presence information of the other members.

* * * * *